(12) United States Patent
Ryan et al.

(10) Patent No.: US 9,033,598 B2
(45) Date of Patent: May 19, 2015

(54) MOTION CONTROL DEVICE

(71) Applicant: SYRP LIMITED, Queenstown (NZ)

(72) Inventors: Benjamin Derek Ryan, Queenstown (NZ); Christopher Ayson Thomson, Queenstown (NZ)

(73) Assignee: SYRP LIMITED, Queenstown (NZ)

( * ) Notice: Subject to any disclaimer, the term of this patent is extended or adjusted under 35 U.S.C. 154(b) by 0 days.

(21) Appl. No.: 14/348,543

(22) PCT Filed: Dec. 10, 2012

(86) PCT No.: PCT/NZ2012/000231
§ 371 (c)(1),
(2) Date: Mar. 28, 2014

(87) PCT Pub. No.: WO2013/085399
PCT Pub. Date: Jun. 13, 2013

(65) Prior Publication Data
US 2014/0226963 A1    Aug. 14, 2014

(51) Int. Cl.
| | |
|---|---|
| *G03B 17/00* | (2006.01) |
| *G03B 15/00* | (2006.01) |
| *F16M 11/04* | (2006.01) |
| *F16M 11/14* | (2006.01) |
| *F16M 11/18* | (2006.01) |
| *F16M 11/20* | (2006.01) |
| *F16M 11/32* | (2006.01) |
| *F16M 11/42* | (2006.01) |

(Continued)

(52) U.S. Cl.
CPC .............. *G03B 15/00* (2013.01); *F16M 11/041* (2013.01); *F16M 11/14* (2013.01); *F16M 11/18* (2013.01); *F16M 11/2014* (2013.01); *F16M 11/32* (2013.01); *F16M 11/425* (2013.01); *F16G 11/103* (2013.01); *G03B 17/561* (2013.01)

(58) Field of Classification Search
CPC ........................................................ G03B 17/56
USPC .................................................... 396/56, 428
See application file for complete search history.

(56) References Cited

U.S. PATENT DOCUMENTS 4,614,337 A * 9/1986 Schonenberger ............... 482/54
4,625,938 A * 12/1986 Brown .......................... 248/550

(Continued)

FOREIGN PATENT DOCUMENTS

KR    20110090429 A    8/2011
WO    WO 2005/013195 A2    2/2005

OTHER PUBLICATIONS

International Search Report of the International Searching Authority for PCT/NZ2012/000231, mailed Feb. 21, 2013. 7 pages.

(Continued)

*Primary Examiner* — Clayton E LaBalle
*Assistant Examiner* — Dennis Hancock
(74) *Attorney, Agent, or Firm* — Perkins Coie LLP

(57) ABSTRACT

Described herein is a motion control apparatus for a camera and methods of use of the apparatus. The apparatus includes a camera attachment and a linear movement assembly operatively associated with a drive mechanism. This configuration causes linear movement of the drive mechanism and the camera attachment in a linear direction along a line or pathway. The apparatus is used for capturing time delay sequences and allows for operation over any desired path length along the line. Further, the apparatus is portable and can be used with other camera accessories.

15 Claims, 20 Drawing Sheets

(51) Int. Cl.
   *F16G 11/10*   (2006.01)
   *G03B 17/56*   (2006.01)

(56) References Cited

U.S. PATENT DOCUMENTS

| | | | | |
|---|---|---|---|---|
| 4,727,390 | A | * | 2/1988 | Brown ........................... 396/420 |
| 5,225,863 | A | * | 7/1993 | Weir-Jones ..................... 396/56 |
| 6,503,163 | B1 | * | 1/2003 | Van Sant et al. ............... 474/101 |
| 2006/0181637 | A1 | * | 8/2006 | Oddsen et al. ................. 348/373 |
| 2007/0054766 | A1 | * | 3/2007 | Shamis et al. .................. 474/47 |
| 2009/0136326 | A1 | * | 5/2009 | Angman ..................... 414/22.54 |

OTHER PUBLICATIONS

Written Opinion of the International Preliminary Examining Authority for PCT/NZ2012/000231, mailed Jan. 8, 2014. 7 pages.

* cited by examiner

MOTION CONTROL DEVICE

RELATED APPLICATIONS

This application is a 35 U.S.C. 371 national phase application of PCT/NZ2012/000231, filed Dec. 10, 2012, which claims priority to NZ 596986, filed Dec. 9, 2011, both of which are hereby incorporated by reference.

TECHNICAL FIELD

The application relates to a motion control device for use in the field of photography and cinematography (still digital photography, film and video). More specifically, the application relates to an apparatus for controlling image capture and camera motion over extended time periods. The apparatus includes a linear movement assembly to allow linear movement of the apparatus along a line.

BACKGROUND ART

The basic principle of photography involves the opening and closing of a camera's shutter which in turn lets light into the camera's lens that travels through onto film or other light sensing surfaces. The lens of the camera is used to channel this light onto a plane or sensor, where it can be recorded and a photo created by one way or another. Video consists of a similar technique, but instead of capturing one image, many frames are recorded every second such as 25 or 30 frames per second. Once played back, motion appears in regular, real-time speed as smooth seamless animation of photographs.

There are many broad forms of photography and cinematography such as wildlife photography, portrait photography, photo journalism photography and aerial photography. Similarly, there are also many techniques of photography and cinematography such as close-up, camera dolly shots, panning shots, racking focus and follow shots.

Time Lapse Photography is a photography/cinematography technique whereby the frequency at which film frames are captured—the frame rate, is much lower than that which is used to play back the sequence. When played back at normal speed, time appears to be moving faster and thus lapsing. For example, an image of a scene may be captured once every second, and then played back at 30 frames per second; the result would be an apparent increase of speed by 30 times.

Time lapsing can be achieved by using either a video camera or a still photography camera configured to capture a sequence of images. Camera settings are adjusted to control desired intervals to take a particular frame or alternatively external devices can be connected to the camera to achieve the same results.

In general, motion control devices are known and used for time-lapse photography and cinematography. For example, some devices require a specific tooth belt in order to operate linear time-lapse movement. Specialised tooth belts are expensive to manufacture and are only produced in limited lengths thereby reducing the maximum distance the device can travel. Some devices may travel along a fixed track in combination with a tooth belt. Again, a track provides limitations in that it requires securing to a ground surface via tripods or other means. A further disadvantage with using a track is that the device has to be specifically configured to drive along the specified track or rail which limits the device's use and adaptability for multi application.

From the above, it can be seen that there is a need for a motion control device that operates more efficiently, reduces the problems associated with the prior art and/or provides the public with a useful choice.

Further aspects and advantages of the embodiments described herein will become apparent from the ensuing description that is given by way of example only.

SUMMARY

Described herein is a motion control device or apparatus used for controlling image capture and camera motion over extended time periods. The apparatus includes a linear movement assembly to allow linear movement of the apparatus along a line. The device may control both the rate at which images are captured as well as camera movement in an infinite number of directions when used with a pan/tilt assembly. Also, the device is configured to operate with other apparatus including but not limited to Jib arms, Slider dollies, Tripods and Cable Cams.

In some embodiments, there is provided a motion control apparatus for a camera wherein the apparatus includes:
  a camera attachment for mounting the camera;
  a drive mechanism linked to the attachment;
  a linear movement assembly including a drive pulley wherein the drive pulley is operatively associated with the drive mechanism; and
  a line;
  wherein in use, the line is wound around the full circumference of the drive pulley and the drive pulley is driven by the drive mechanism, such that actuation of the pulley by the drive mechanism causes linear movement of the drive mechanism and the camera attachment in a linear direction along the line.

In some embodiments, there is provided a method of operating a motion control apparatus for a camera which includes the steps of:
  a) mounting the camera on a camera attachment;
  b) mounting a linear movement assembly to a drive mechanism linked to the attachment including a drive pulley wherein the drive pulley is operatively associated with the drive mechanism and a line; and
  c) wherein in use, winding the line around the full circumference of the drive pulley and driving of the drive pulley by the drive mechanism, such that actuation of the pulley by the drive mechanism causes linear movement of the drive mechanism and the camera attachment in a linear direction along the line.

Advantages of the above device may include one or more the following:

Physical Componentry

The device may be used in conjunction with any support apparatus such a slider, jib arm or cable cam through the rope fastening accessory without the requirement of a custom built support apparatus that usually comes bundled with prior art apparatus-specific motion control equipment.
  The device is able to produce both linear and axial movement through the interchangeable assemblies: the linear movement and pan/tilt movement assemblies. These assemblies enable the device to achieve both linear and axial range of movement on one single device.
  Some embodiments do not require a specific tooth belt in order to operate linear time lapse movement. Instead of using expensive and specialized tooth belts not usually manufactured to requisite long lengths, a simple rope may be used to drive the device along a track or other non specialized equipment.

Traditionally a track provides limitations in that it is secured to a ground surface via tripods or other means whereas a cable is tightened at either end and may be run over lakes, rivers or between buildings with no ground fixings. Therefore, the ease of using rope with this device allows a simple cable setup to be utilized by running any length of standard rope between the start and end points of the device. For example, a cable cam setup that may span over any length that the user requires, as the set up is only limited by the length of the chosen cable and rope. In comparison, other motion control devices that require lengths of track cannot extend securely over areas that do not have ground fixings such as over water or between buildings.

Additionally there are no limitations as to what film equipment the device could drive, as the device is configured to operate with any existing equipment and uses a standard thread insert to screw both the panning and linear assemblies into any type of regular slider, tripod, dolly, cable cam or the like. All sliders, tripods and related film equipment come equipped with either a standard ¼ UNC thread or a ⅜ UNC thread both of which the device has integrated into the assemblies, so it may easily be attached to any equipment.

The device is extremely portable being a relatively small integrated unit with all batteries, controllers (software) and drive unit (motor) included all within one housing or box. From a filming perspective this has significant advantages as typically time lapse photography and motion control shoots occur in remote environments, often in the mountains or similar places, so portability remains a key factor in supplying equipment into these locations. The entire device or unit may fit inside the smallest of camera bags.

Software Componentry

The device may be activated using an Auto Start Function that is controlled by a timer and/or the sensor input including, but not limited to light, motion and sounds sensors, infrared emitters, laptop computers, phone or any device capable of sending or receiving digital or analog signals. Once the user starts the Auto Start Program, the microprocessor waits for the auto start condition i.e. the timer and/or sensor input automatically executes the action and finishing conditions.

The ramp in/ramp out function enables a user to input their parameters which includes the acceleration time and deceleration time; the microprocessor stores the values entered by the user. The microprocessor then calculates the device timing and enables the device to have a controlled accelerated start movement and controlled decelerated end movement.

The device may be activated to perform a preview. To preview the movement of the device, the microprocessor evaluates the current program and calculates what the final movement of the time lapse or shot will look like by evaluating the recording distance and the playback time, the device then executes the movement in real-time so the user may review and adjust the settings as necessary.

The device has user programmable presets. In this mode, the user inputs their preferred parameters and then renames and saves as a preset and the microprocessor stores the values. The user may then revisit the saved item and select a saved preset to start the device. This feature has many useful applications since you may essentially have a list of presets that are applied to certain situations. For example, time lapse of people, time lapse of sunrise or time lapse of stars etc.

The evaluation of shot speed calculation. Shot speed calculation is evaluated through a number of user defined values namely the recording time, playback time and ramp in/ramp out. The user may also change the frames per second, auto focus and move shoot delay. The microprocessor calculates the device timing values from these evaluated parameters, namely the shot timing, movement timing and shot movement distance then the microprocessor stores the device timing values ready to output to the device for motion control.

The device includes mode recognition and is able to read the mode input value which is generated from the activation of the hall effect sensors that distinguish if the linear movement or the pan/tilt movement assemblies are connected and subsequently displays the appropriate menu and executes the appropriate calculations.

The device also has the ability to auto power off. The user sets the end condition to auto power off and the microprocessor saves the user data and sends a signal to the power supply to execute the device to shutdown.

The device also has the ability to return to home. The user sets the end condition to return to home and upon execution, the microprocessor returns the device to the start position by evaluating its current position, then calculating the device movement required and finally moving the device to the start position.

The device includes accessory recognition. The microprocessor reads the mode input value from an analog voltage gathered from an interface port and the microprocessor references the voltage to an accessory database. The microprocessor then displays the appropriate menu, adding items such as, but not limited to additional function and sensor setup. The microprocessor then executes the appropriate calculations.

The device includes an infrared emitter accessory to control the camera. The microprocessor automatically recognises an accessory once it is connected through an interface port. The graphic user interface displays the infrared setup and the user inputs the settings, the microprocessor references the infrared control database and emits an infrared frequency to the accessory. The infrared emitter accessory controls the camera.

The device also is supplied with factory presets with supplied device timing data so the user may simply select a factory preset to begin a recording.

BRIEF DESCRIPTION OF THE DRAWINGS

Further aspects of the various embodiments described herein will become apparent from the following description which is given by way of example only and with reference to the accompanying drawings in which.

DETAILED DESCRIPTION

Figure 1:
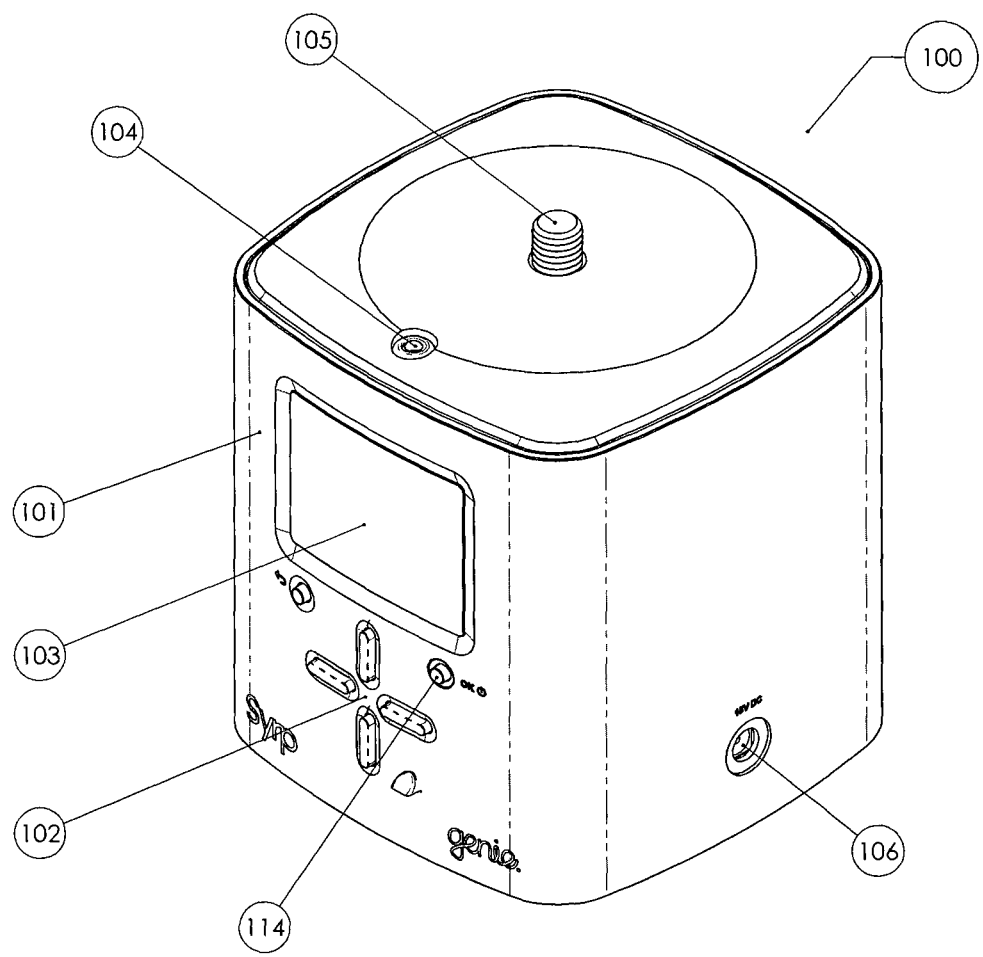
FIG. 1 illustrates a front perspective view of the device.

As noted above, described herein is a motion control device or apparatus used for controlling image capture and camera motion over extended time periods. The apparatus includes a linear movement assembly to allow linear movement of the apparatus along a line. The device may control both the rate at which images are captured as well as camera movement in an infinite number of directions when used with a pan/tilt assembly. Also, the device is configured to operate with other apparatus including but not limited to Jib arms, Slider dollies, Tripods and Cable Cams.

For the purpose of this specification the term 'comprise' and grammatical variations thereof shall have an inclusive meaning—i.e. that it will be taken to mean an inclusion of not only the listed components it directly references, but also other non-specified components or elements. For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

In some embodiments, there is provided a motion control apparatus for a camera wherein the apparatus includes:
 a camera attachment for mounting the camera;
 a drive mechanism linked to the attachment;
 a linear movement assembly including a drive pulley wherein the drive pulley is operatively associated with the drive mechanism; and
 a line;
 wherein in use, the line is wound around the full circumference of the drive pulley and the drive pulley is driven by the drive mechanism, such that actuation of the pulley by the drive mechanism causes linear movement of the drive mechanism and the camera attachment in a linear direction along the line.

The drive mechanism may include a drive coupling operatively associated with a motor drive configured to engage with the drive pulley. The drive coupling is in the form of a geared wheel and the drive coupling rotates about a central axis of an accessory plate. In this way, the splined teeth of the drive coupling correspond with the inner teeth of the drive pulley to permit rotational movement of the drive pulley. Also, the accessory plate allows the components such as the drive pulley to be housed within the linear movement assembly for compact installation and integration.

The linear movement assembly may be detachable and may include a rubber pad. An advantage of this configuration is that other interchangeable accessories may be easily attached and removed depending on required use. The rubber pad provides a cushioning effect to absorb any impact that may occur during operation and serves a gripping purpose, preventing the assembly and device from slipping from a surface they may be attached to.

Also to enhance detachability of the linear movement assembly, the assembly may include attachment points located about the edge of the accessory plate for engagement with a quick release mechanism on the motion control device.

Guide rollers may be located about the outside of the drive pulley and a combination of ribbed and flat rollers may be utilised. The ribbed rollers may assist with alignment of the line as the line contacts the surface of the ribs. The rollers may rotate freely about an axis when mounted between an accessory plate and a mounting plate to provide minimal resistance while guiding the line wound around the circumference of the drive pulley.

In some embodiments, the line may be rope. An advantage of using simple rope to move the device is that it may allow longer track systems to be utilised that do not require specialised belts or fixed tracks. For example, the ease of using rope is that any length of standard rope may be selected between a given start and end point, attached to the device and configured with a cable cam setup. In this way, any desired length between start and end points may be selected without the limitation of a fixed track length.

To secure the line or rope, the line may pass through the linear movement assembly under the lowest rib of the ribbed roller, then wound around the full circumference of the drive pulley before exiting the linear movement assembly over the top of the ribbed roller thereby passing over the flat rollers and the drive pulley. An advantage of winding the line around the full circumference is that it minimises slippage of the rope when driven by the drive pulley while being self supporting within the linear movement assembly.

The linear movement assembly may be mounted to any support apparatus which may include, but not be limited to a camera slider, camera dolly, camera jib arm, cable cam or the like.

The motion control device may include a rope fastening device for clasping a piece of rope. This device may include a rope clasping device, and attachment straps. The fastening device may be used at each terminal end of a track or path to secure the rope and keep the line taut when in use.

The motion control device may include a panning movement assembly for axial range of movement and rotation of the motion control device.

As with the linear movement assembly, the panning movement assembly may be detachable and includes a mounting disc on the underside of an accessory plate. For ease of attachment and detachment, the panning movement assembly may include attachment points for engagement with a quick release mechanism on the motion control device.

The panning movement assembly may be mounted to any support apparatus which may include, but not be limited to a tripod head or legs.

The motion control device may include at least two location posts to prevent the device from rotating about the linear or panning movement assemblies or while a motor drives the drive mechanism. In this way, the assemblies remain in a fixed position when attached to the device.

The motion control device may be an integrated unit where all batteries, controllers or software and drive mechanism are located within the housing of the device. An advantage of this configuration is that the device is extremely lightweight and portable which is an essential requirement for motion control shoots that may occur in remote locations.

In some embodiments, there is provided a method of operating a motion control apparatus for a camera which includes the steps of:
  a) mounting the camera on a camera attachment;
  b) mounting a linear movement assembly to a drive mechanism linked to the attachment including a drive pulley wherein the drive pulley is operatively associated with the drive mechanism and a line; and
  c) wherein in use, winding the line around the full circumference of the drive pulley and driving of the drive pulley by the drive mechanism, such that actuation of the pulley by the drive mechanism causes linear movement of the drive mechanism and the camera attachment in a linear direction along the line.

The method above may include optionally attaching a panning movement assembly to the device for axial range of movement of and rotation of the motion control device.

The embodiments described above may also be said broadly to consist in the parts, elements and features referred to or indicated in the specification of the application, individually or collectively, and any or all combinations of any two or more said parts, elements or features, and where specific integers are mentioned herein which have known equivalents in the art to which the embodiments relates, such known equivalents are deemed to be incorporated herein as if individually set forth, Where specific integers are mentioned herein which have known equivalents in the art to which this device relates, such known equivalents are deemed to be incorporated herein as if individually set forth.

WORKING EXAMPLES

The above described apparatus, method and uses are now described by reference to specific examples.

Description of Physical Components

Example 1

Referring to FIG. 1, the device 100 includes an outer housing 101 that is manufactured out of high strength polymer. Other sufficiently rigid and strong materials that may be used are various metal alloys.

Figure 14:
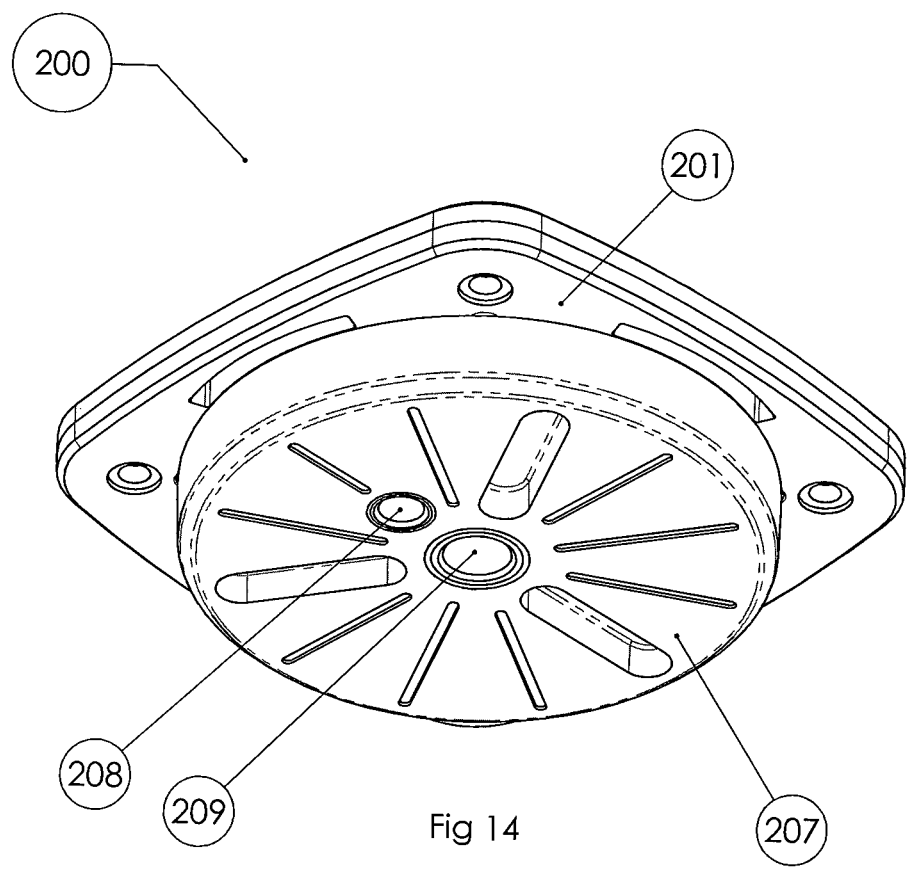
FIG. 14 illustrates a bottom perspective view of the panning movement assembly of FIG. 13.

On the front side of the outer housing 101 there is a keypad 102 which has an 'OK' button 114 including other navigation keys, and a graphic user interface 103. Near the edge of the topside of the device 100 is a spirit level 104 and in the centre of the top side of the device 100 is a thread 105. The thread 105 on top of the device 100 is used to attach other existing photographic equipment to the top of the device 100. Accordingly, the top surface of the device 100 is dimensioned to support a variety of existing photographic apparatus such as a 75 mm standard tripod head or camera. For example, as shown in FIG. 14, the corresponding mounting disc 207 is dimensioned to securely attach tripod legs with a 75 mm half ball attachment. The large threaded hole 209 is sufficiently sized to attach a standard ⅜-20 UNC screw. The small threaded hole 208 is sufficiently sized to attach a ¼-20 UNC Standard screw.

On the right side of the device 100 there is a DC power connector 106. The DC power connector 106 is used for power input and enables battery pack 505 (best seen in FIG. 4) within the device 100 to be charged or for the device 100 to run directly from an external power source.

The device 100 is activated by pressing and holding the 'OK' button 114, which provides electrical current to the required power PCB 502 and the display PCB 501. The keypad 102 is used to navigate through software functions on the graphic user interface 103 that sets how the device 100 controls the camera and movement of the device 100.

Figure 3:
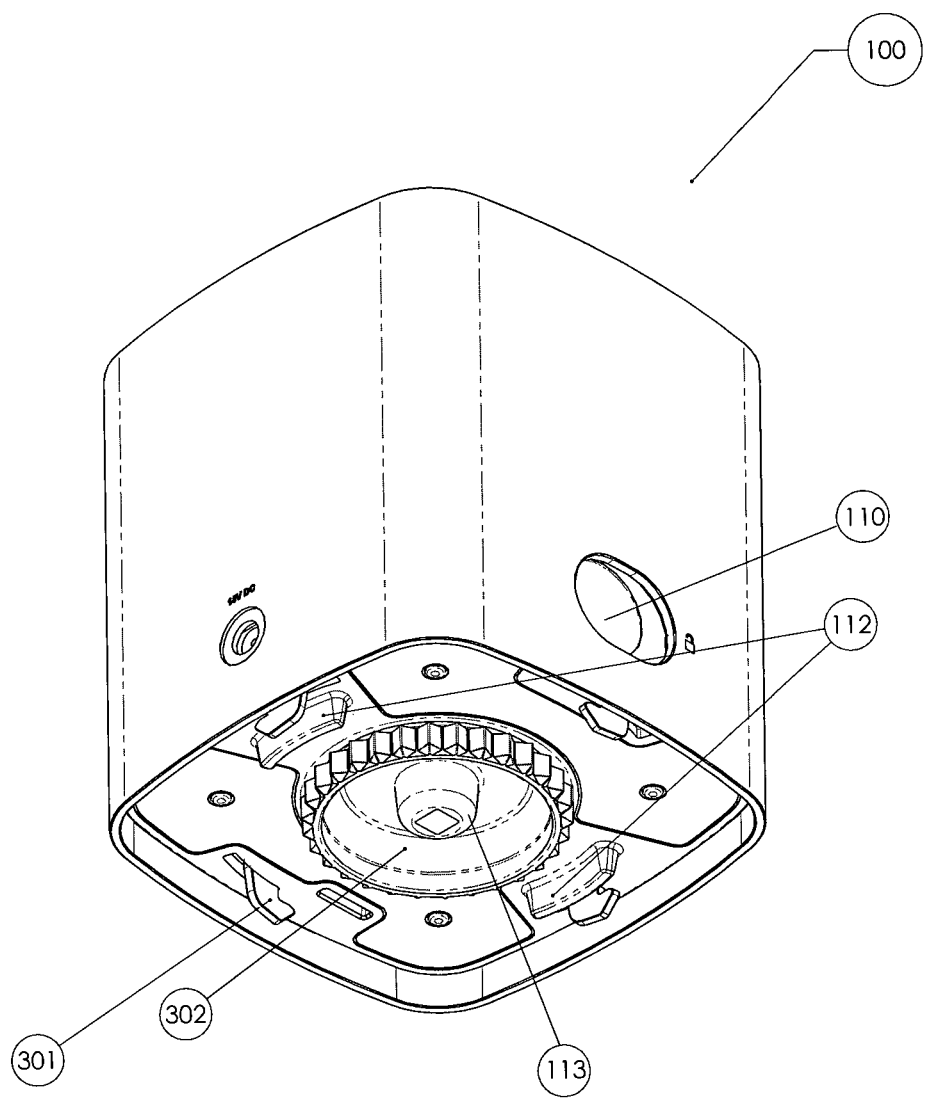
FIG. 3 illustrates a bottom perspective view of the device of FIG. 1.

The device 100 houses the central processing software and is connected to other accessories for additional control. The primary additional components needed to use the motion control functions of the device 100 include the detachable movement assemblies, namely the linear movement assembly 300 and pan/tilt movement assembly 200 (described later). These assemblies 300 and 200 attach to the bottom of the device 100 via the quick release latches 301 (FIG. 3). These assemblies 300 and 200 allow the device 100 to be used with other types of film equipment apparatus.

Figure 2:
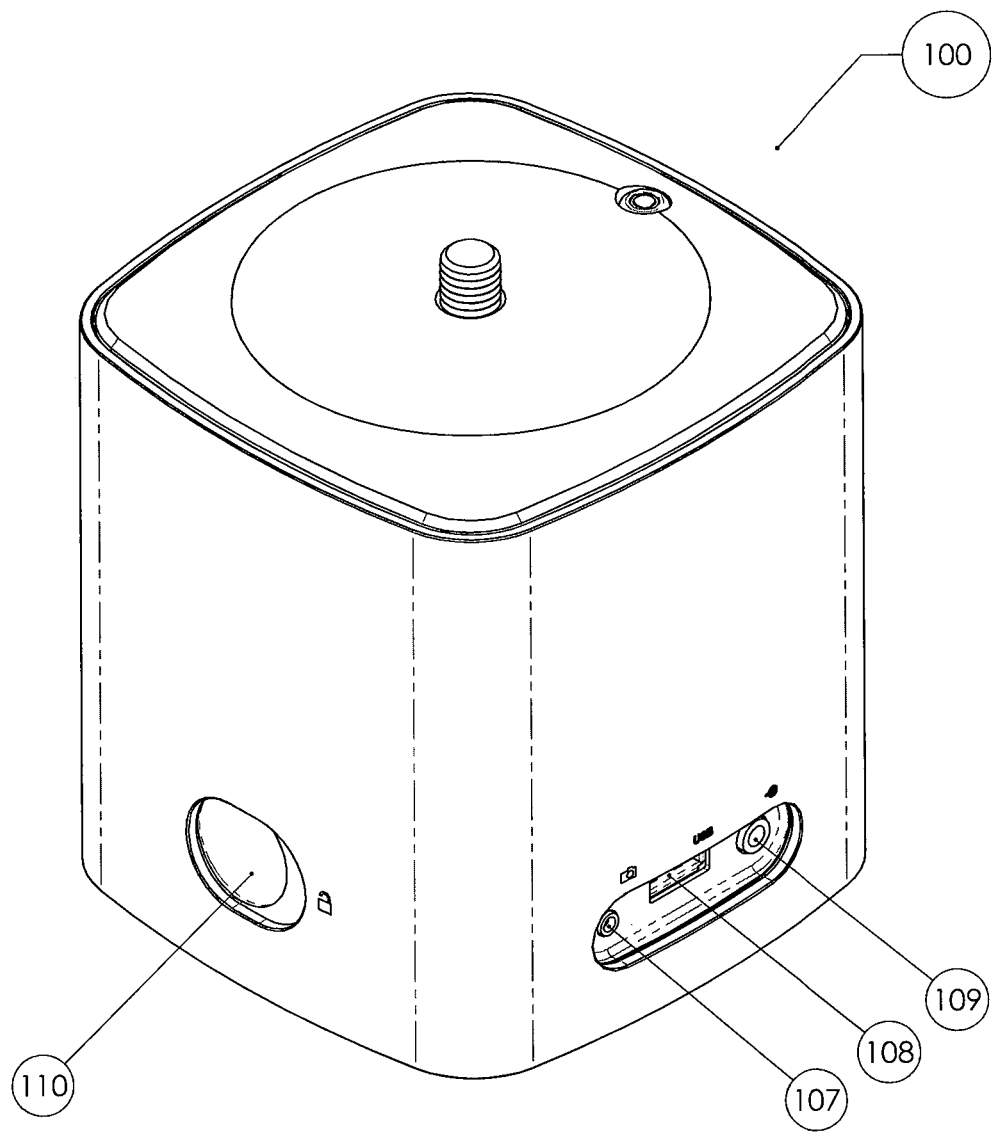
FIG. 2 illustrates a rear perspective view of the device of FIG. 1.

Referring to FIG. 2, on the left side of the device 100 there are three interface ports 107, 108 and 109. The interface port 107 is used to plug the device 100 into a camera for one way communication from the device 100 to the camera's shutter port. The interface port 108 is used to host other digital components via a universal serial bus protocol. The interface port 109 is a two-way communication port so the device 100 may interact with a variety of external accessories including, but not limited to light, motion and sounds sensors, infrared emitters, laptop computers, phone and any device capable of sending or receiving low voltage digital or analog signals. On the rear of the device 100 there is a quick release slider 110 which is dimensioned at approximately 15 to 25 mm to keep the device sufficiently portable, yet allow the slider to be operated by a finger.

FIG. 3 shows the underside of the device 100 where the drive coupling in the form of geared wheel 302 is located in the region where accessories attach to the device 100. Accessories include, but are not limited to the panning movement assembly 200 and the linear movement assembly 300. The device 100 includes four quick release latches 301 which are centrally located. The latches 301 are spring loaded and slide in a rotary motion around the motor drive 113 by moving the quick release slider 110. This in turn releases or engages the attached accessory or assembly. Also, the device 100 includes two location posts 112 positioned outside the central axis of the device 100 to prevent the device 100 from rotating on the attached accessory or assembly while the internal electrical motor 503 (not shown) drives the motor drive 113.

Figure 4:
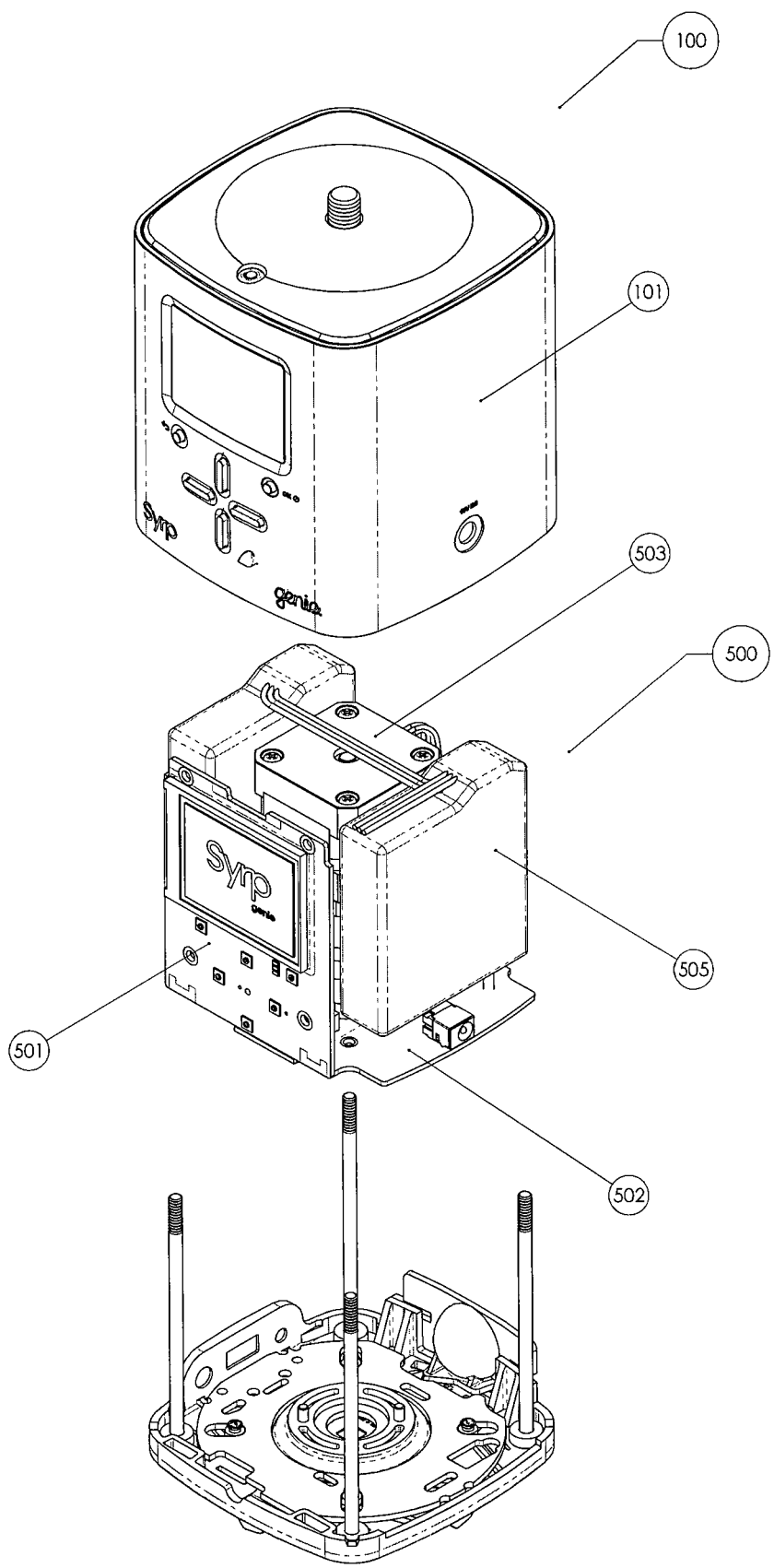
FIG. 4 illustrates a front exploded view of the internal components of the device of FIG. 1.
Figure 5:
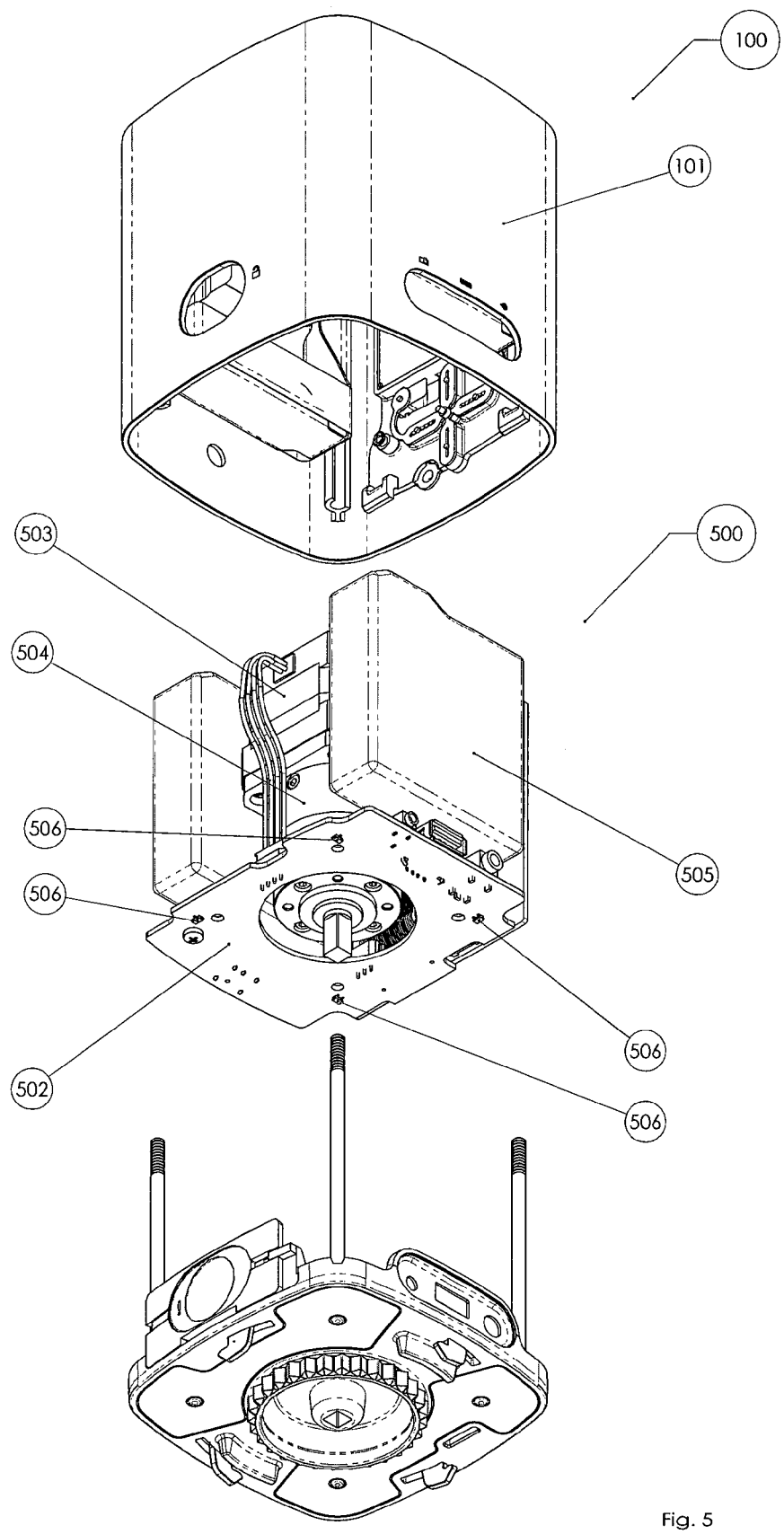
FIG. 5 illustrates a rear exploded view of the internal components of the device of FIG. 1.

The four main internal components 500 of the device 100 are shown in FIGS. 4 and 5 that are mounted inside the outer housing 101. The main internal components are the display PCB 501 which is located on the inside of the front of the device 100, and power PCB 502 located on the inside at the base of the device 100. On the underside of the power PCB 502 there are four hall effect sensors 506 which are positioned to align with the identification holes on the accessory plate. The electrical motor 503 may be seen in the centre of the device running along its vertical axis. The device contains a battery pack 505 which is located on the inner left and right sides of the device 100.

Figure 6:
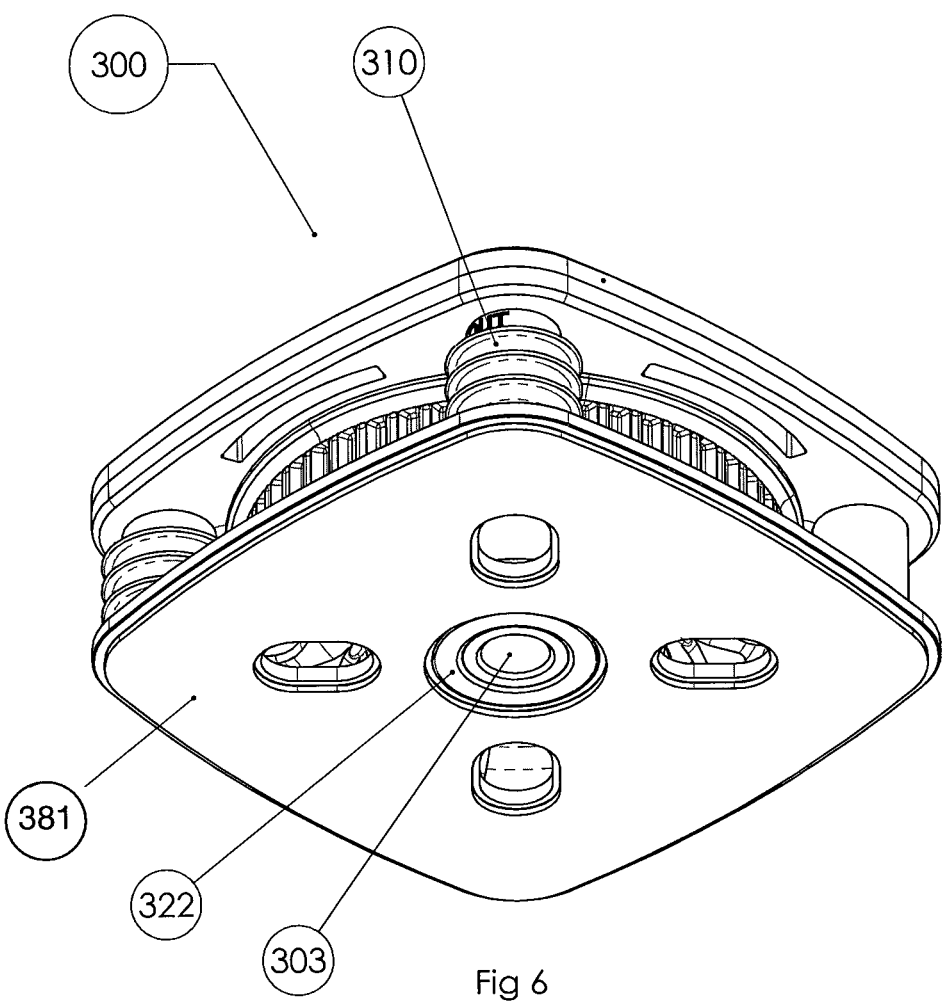
FIG. 6 illustrates a bottom perspective view of the linear movement assembly.
Figure 7:
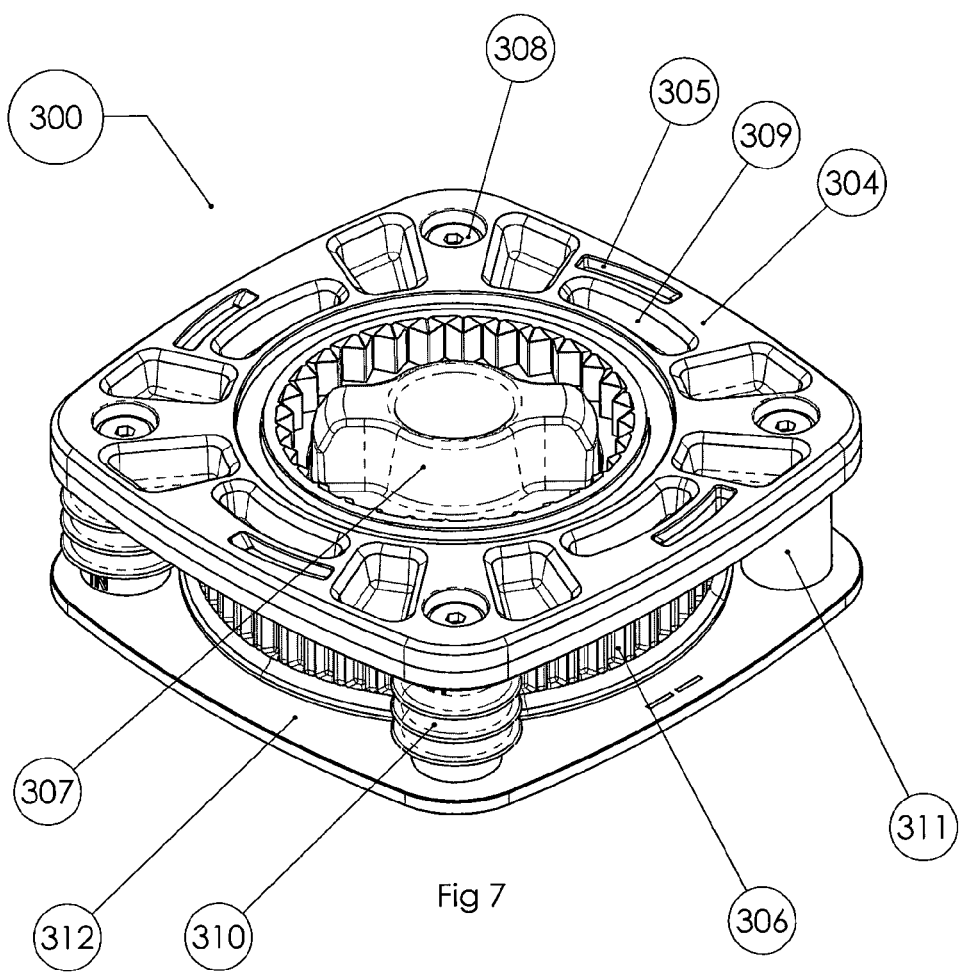
FIG. 7 illustrates a top perspective view of the linear movement assembly of FIG. 6.

FIGS. 6 and 7 show the detachable linear movement assembly 300 which is used to control linear movement of the device 100 once attached. The detachable linear movement assembly 300 is manufactured out of a high strength polymer and includes a rubber pad 381 to give some impact resistance and running through the central axis of the linear accessory 300 is a mounting nut 322. The mounting nut 322 has a large thread hole 303 located in the centre where the large thread hole 303 is dimensioned to attach a standard ⅜-20 UNC screw.

Referring to FIG. 7, the linear movement assembly has an accessory plate 304 which has four catch points 305 located around edge of the accessory plate. The catch points 305 are located to align with the location of the quick release latches 301 on the device 100. The accessory plate 304 houses the drive pulley 306 the top of which configured to engage with the motor drive 113. In the centre of the drive pulley 306, the top section of the mounting nut 322 (FIG. 6) includes a mounting or tightening grip 307. There are four assembly screws 308 located in the corners of the accessory plate 304. There are also four locating holes 309 which are placed to match the position of the location posts 112 on the device 100. Around the outside of the drive pulley 306 there are two ribbed rollers 310 and two flat rollers 311. The drive pulley 306, ribbed rollers 310, flat rollers 311, and mounting nut 322 rotate freely while mounted between the accessory plate 304 and the mounting plate 312.

Figure 8:
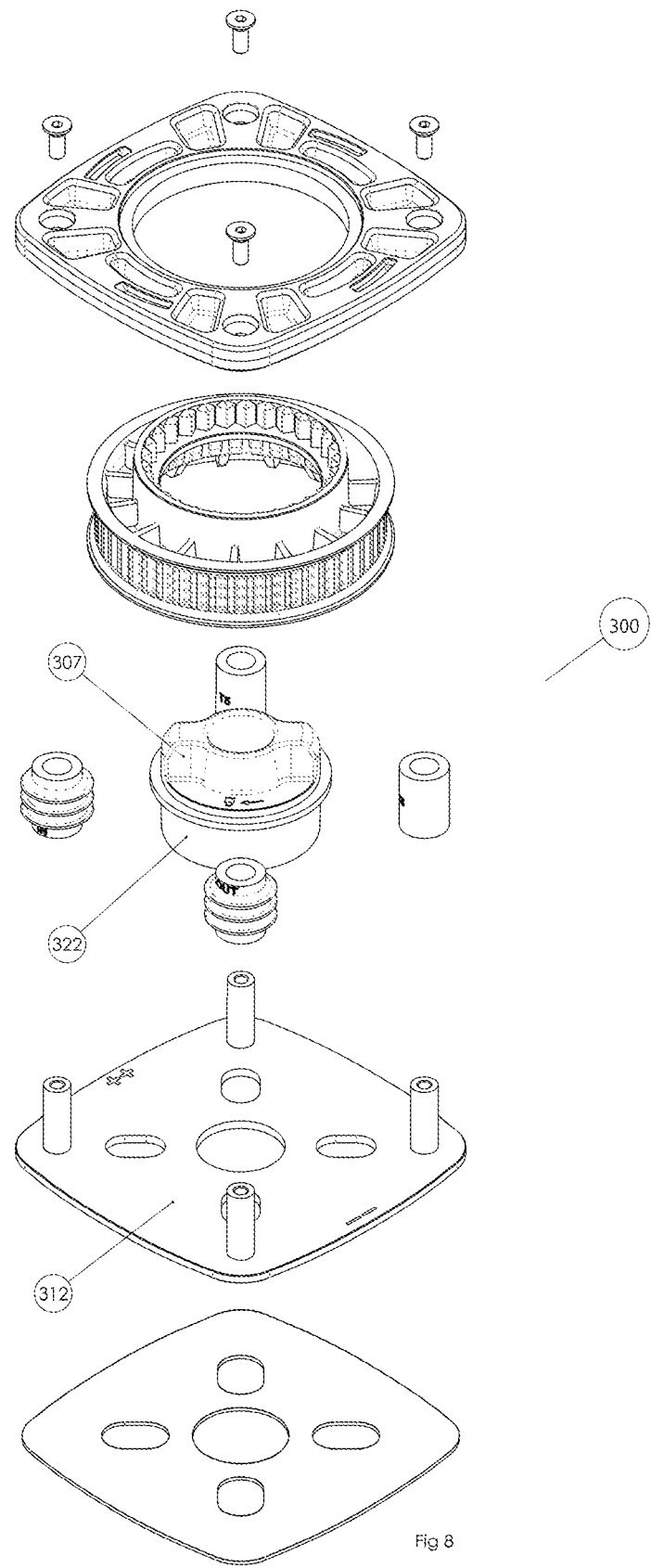
FIG. 8 illustrates an exploded view of the linear movement assembly of FIG. 7.

The linear movement assembly 300 is mounted to any support apparatus by the mounting plate 312 (FIG. 8) such as a Camera Slider, Camera Dolly, Camera Jib Arm or Cable Cam and secured by the mounting nut 322 shown in FIG. 6 which includes a large threaded hole 303. The mounting or tightening grip 307 (FIG. 7) anchors the mounting plate 312 shown. Any type of other adhesive or mechanical fixing means maybe used to secure and attach the assembly 300.

Figure 9:
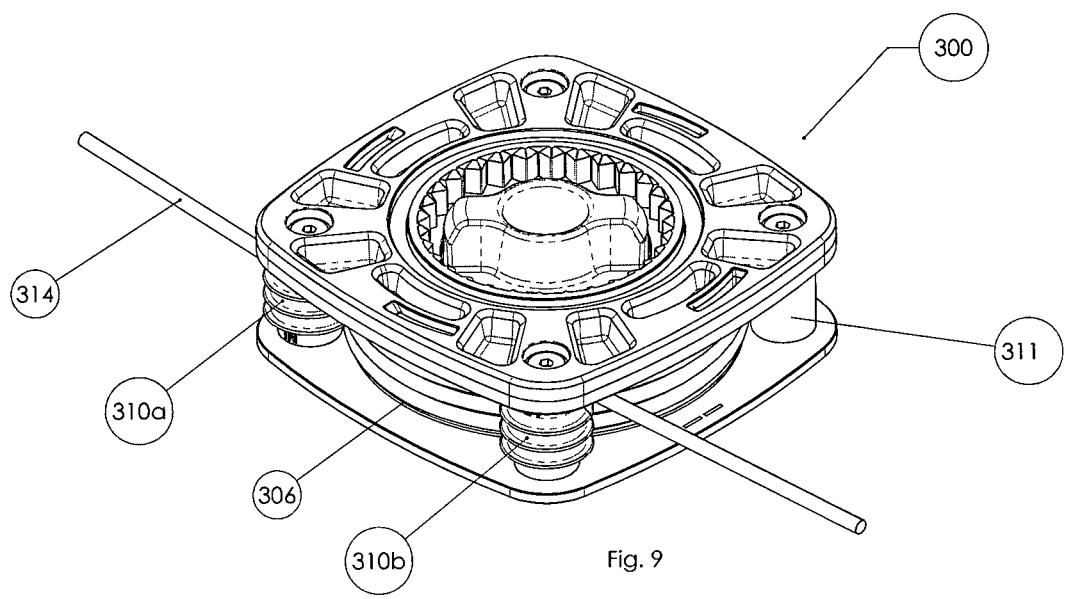
FIG. 9 illustrates a perspective view of the linear movement assembly of FIG. 7 with rope inserted.
Figure 10:
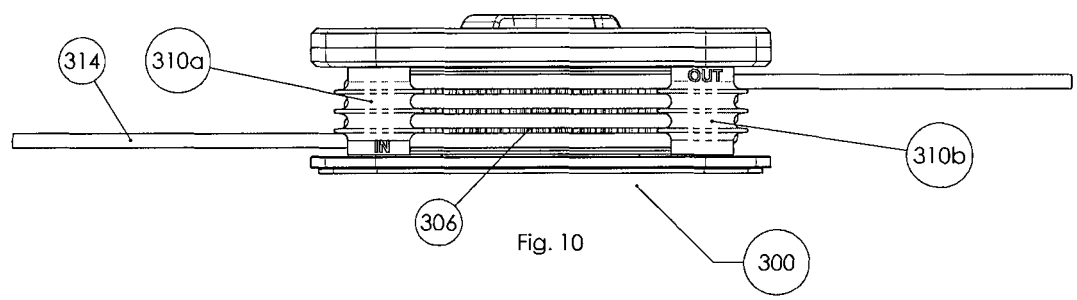
FIG. 10 illustrates a side view of the linear movement assembly of FIGS. 6 and 7 with rope inserted.
Figure 11:
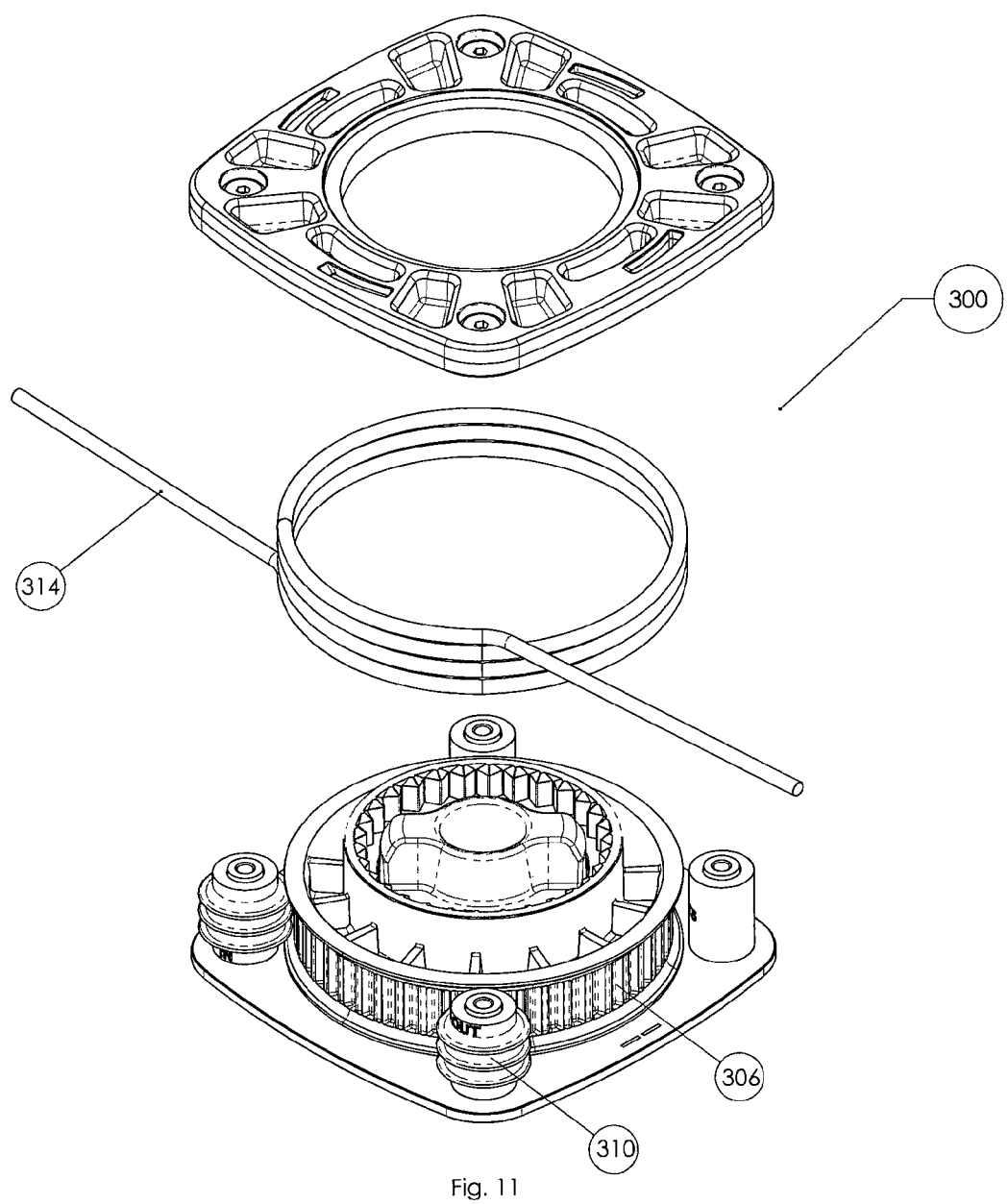
FIG. 11 illustrates an exploded view of the linear movement assembly of FIG. 9 showing the rope in/out path.

FIGS. 9 and 10 shows the linear movement assembly 300 in perspective view and side view respectively of a small section of rope 314 entering the linear accessory 300 from the left, passing under the lowest rib of the ribbed roller 310a, then wrapping around the entire circumference of the drive pulley 306 before exiting the linear accessory 300 over the top rib of ribbed roller 310b passing over the flat rollers 311 and drive pulley 306. The rope 314 is approximately 3 mm in diameter and is sufficiently strong enough to support the weight of the device 100 and other typical photographic apparatus such as a tripod head and camera. The linear movement assembly 300 is shown partially exploded in FIG. 11. The rope 314 is shown in its coiled position as it is would be when wrapped around the circumference of the drive pulley 306 and guided by the ribbed rollers 310.

Figure 12:
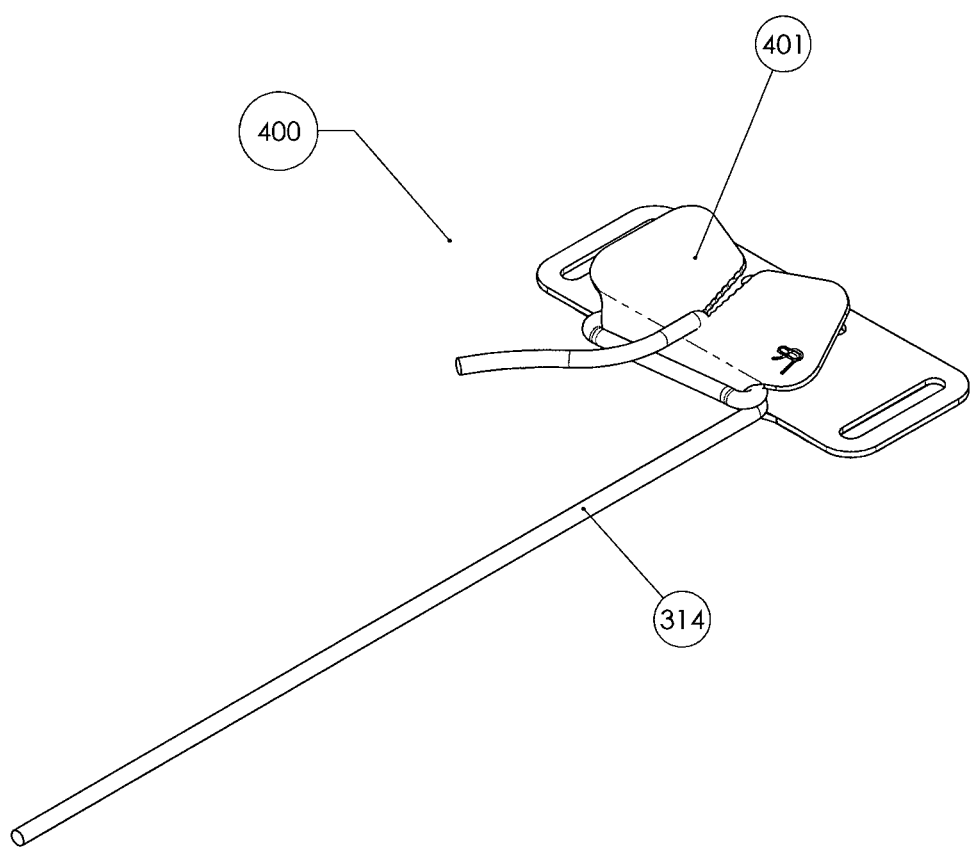
FIG. 12 illustrates a perspective view of the rope fastening accessory.

FIG. 12 shows a rope fastening accessory 400 that includes a rope clasping device 401 manufactured out of alloy steel or high strength polymer, and attachment straps (not shown). The attachment straps are manufactured out of nylon webbing or any other material such as, but not limited to leather and rubber. The rope fastening accessory 400 is secured to any type of support apparatus such as, but not limited to a slider, jib arm or cable cam using the attachment straps. The attachment straps are fastened in known fashion to the required support apparatus. The rope 314 is then secured to the rope clasping device 401 at one end of the apparatus by winding it around and locking it off so that it is taut at both ends.

Figure 13:
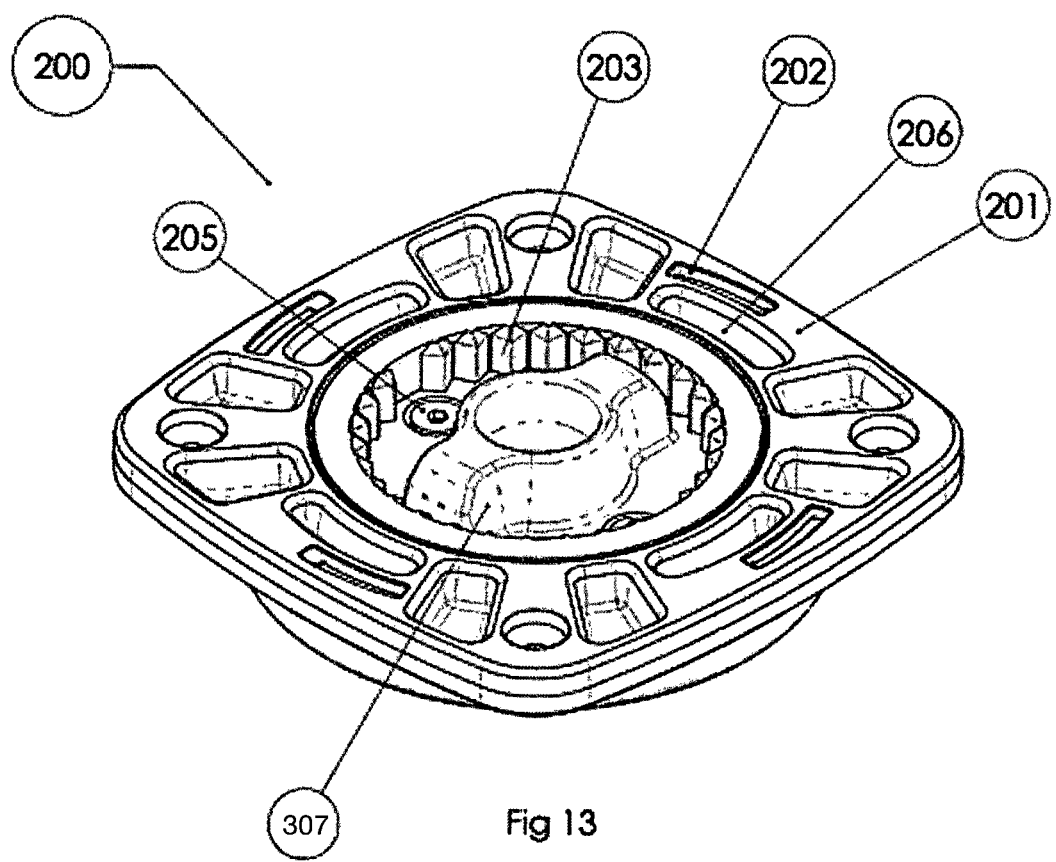
FIG. 13 illustrates a top perspective view of the panning movement assembly.

FIG. 13 shows the panning movement assembly 200 that is used to control the rotating motion of the device 100 once attached. The panning movement assembly 200 is manufactured out of high strength polymer or any other sufficiently rigid and strong material such as, but not limited to various metal alloys. The detachable panning movement assembly 200 is attached to any kind of support apparatus such as but not limited to tripod legs or tripod head. The large threaded hole 209 or the small threaded hole 208 (FIG. 14) is used to mount the panning movement assembly 200 to the apparatus. However, any type of other adhesive or mechanical fixing means also may be used.

The panning movement assembly 200 has an accessory plate 201 which has four catch points 202 located around edge of the accessory plate 201. The catch points 202 are located to align with the location of the quick release latches 301 on the device 100. The device 100 is then connected to the detachable panning accessory 200 via the quick release latches 301 and catch points 202. To release the panning accessory 200 from the device 100 the quick release slider 110 is slid across which in turn rotates the quick release latches 301 that release the panning accessory 200 from the device 100.

The accessory plate 201 houses the drive coupling 203 which is configured to connect with the motor drive 113. The drive coupling 203 has a tightening grip 204 in the centre. There are two assembly screws 205 located around the central axis of the drive coupling 203. Also, there are four locating holes 206 which are positioned to correlate with the location of the location posts 112 on the device 100.

Referring to FIG. 14, the detachable panning movement assembly 200 has a mounting disc 207 on the underside of the accessory plate 201. On the base of the mounting disc 207 there is a small threaded hole 208 and a large threaded hole 209.

Figure 15:
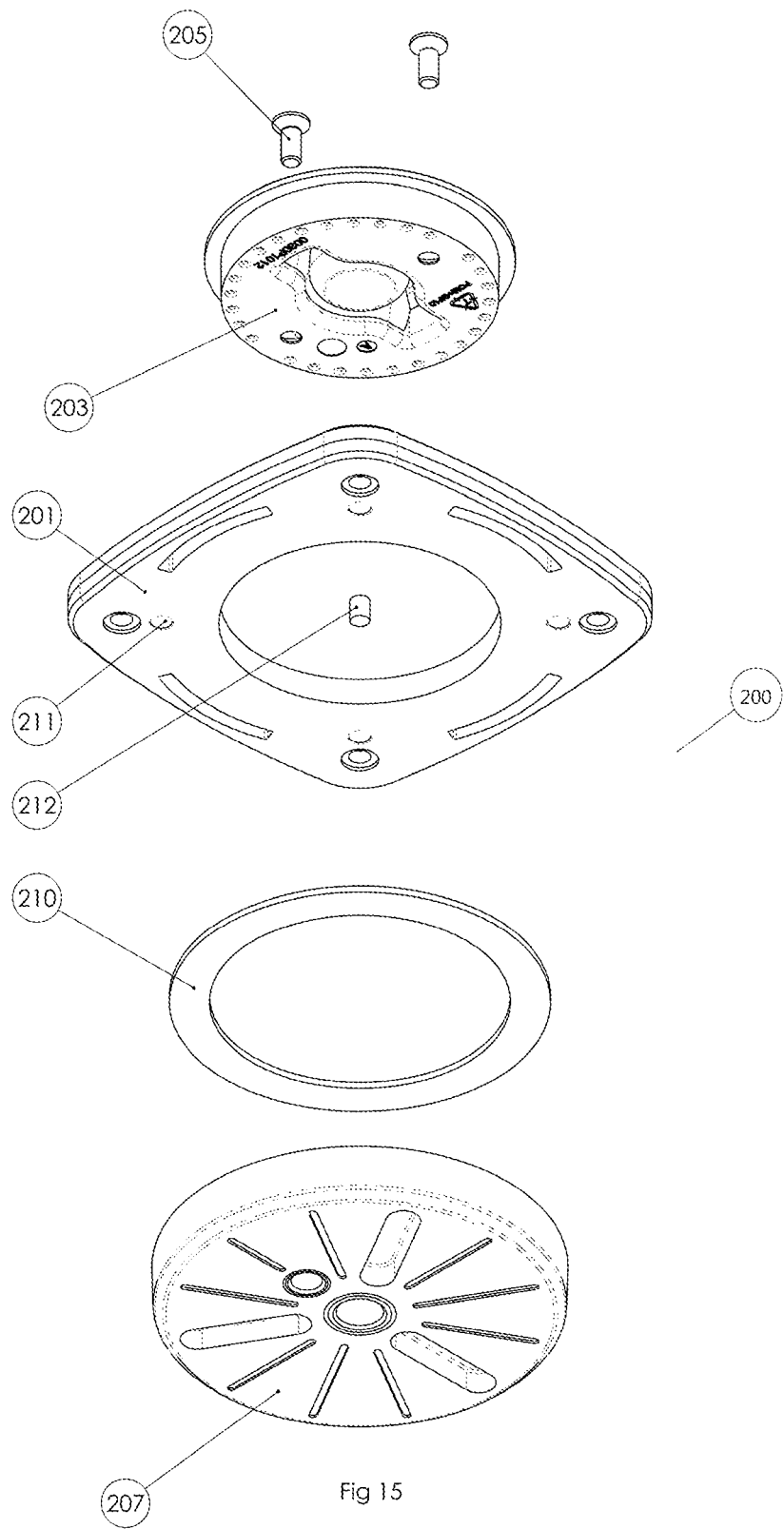
FIG. 15 illustrates an exploded view of the panning movement assembly of FIGS. 13 and 14.

Referring to FIG. 15, the mounting disc 207 is screwed to the drive coupling 203 using the assembly screws 205. The mounting disc 207, drive coupling 203 and assembly screws 205 rotate freely around the central axis of the accessory plate 201. Between the accessory plate 201 and the mounting disc 207 there is a dampening disc 210. On the underside of the accessory plate 201 there are four identification holes 211 where a magnet(s) 212 are inserted.

In Use

Slider

Figure 16:
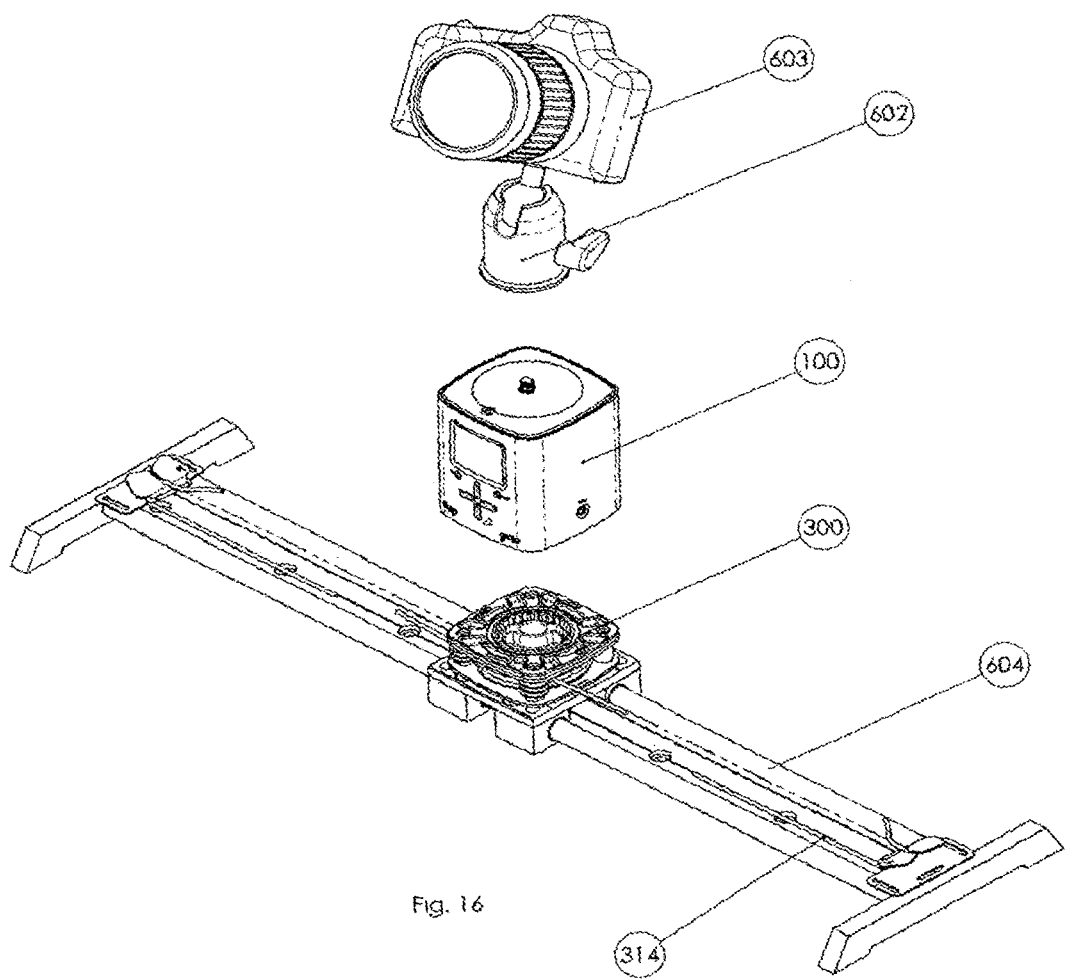
FIG. 16 illustrates an exploded view of the device in use with the linear movement assembly and a slider.

With reference to FIG. 16, the example shows a partially exploded view of a typical situation where the device 100 may be used. In this example, the device 100 is used with a slider 604, a camera mount 602, a camera 603, two rope clasping devices 401, and rope 314.

Each end of the rope 314 is now connected to a fixing point in line with and beyond the maximum desired movement of the device 100. The detachable linear movement assembly 300 is screwed into the slider 604, the device 100 may then be clicked into the detachable linear movement assembly 300 and is operative with the slider 604. A camera 603 is screwed into the top of the device 100 and the rope 314 is threaded through the detachable linear movement assembly 300. The rope 314 is then attached securely to each end of the slider 604 using the rope clasping devices 401. Once connected and activated by the user the device 100 will drive itself along the rope 314 at a rate determined by the parameters set using the graphic user interface 103 and keypad.

Tripod

Figure 17:
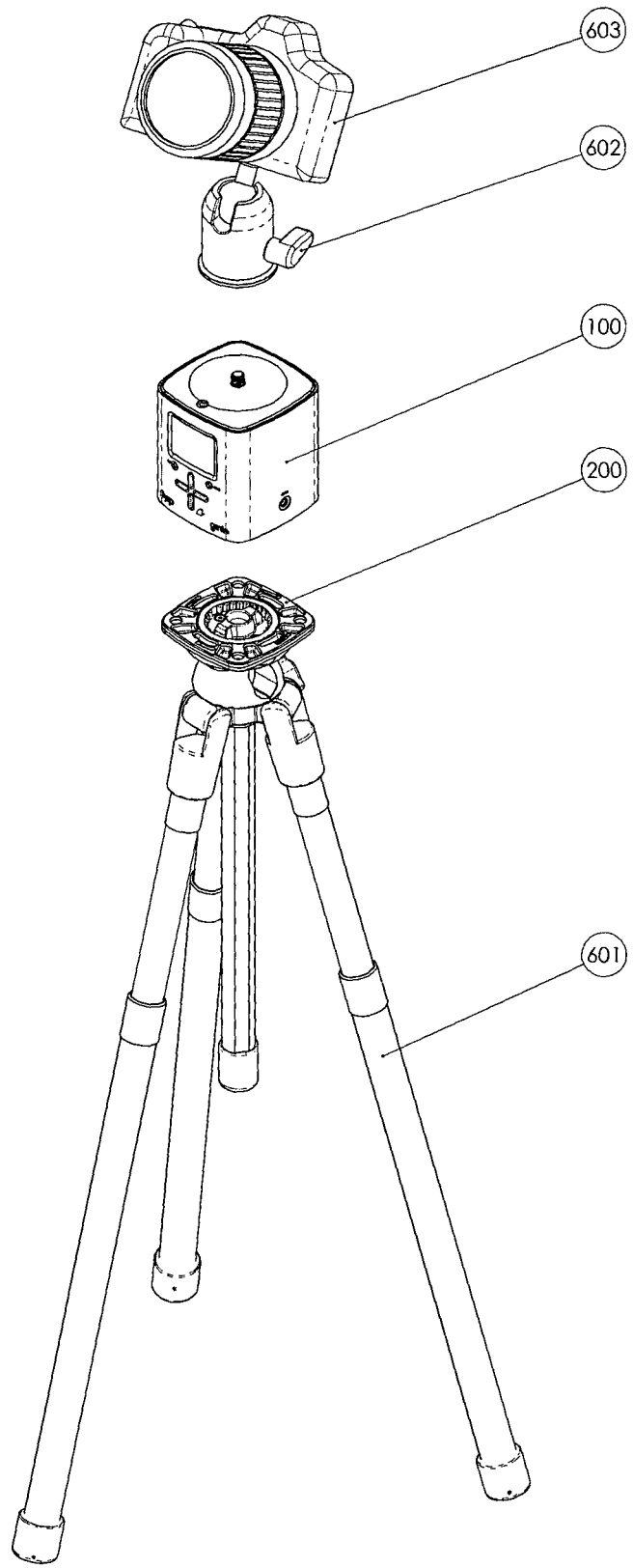
FIG. 17 illustrates an exploded view of the device in use with the panning movement assembly and a tripod.

With reference to FIG. 17, the example shows a partially exploded view of another typical situation where the device 100 may be used. In this example, the device 100 is used with the panning movement assembly 200, tripod legs 601, a camera mount 602, and a camera 603. The panning movement assembly 200 is attached to tripod legs 601 by screwing it on via the large thread hole 209. The device 100 may then be attached to the tripod legs 601 by simply clicking it into the panning movement assembly 200 that is attached to the tripod legs 601. Once the device 100 is attached, the camera 603 may be screwed onto the device 100 and programmed to rotate around the attached mounting disc 207 which is firmly screwed into the tripod legs 601.

Example 2

Figure 18:
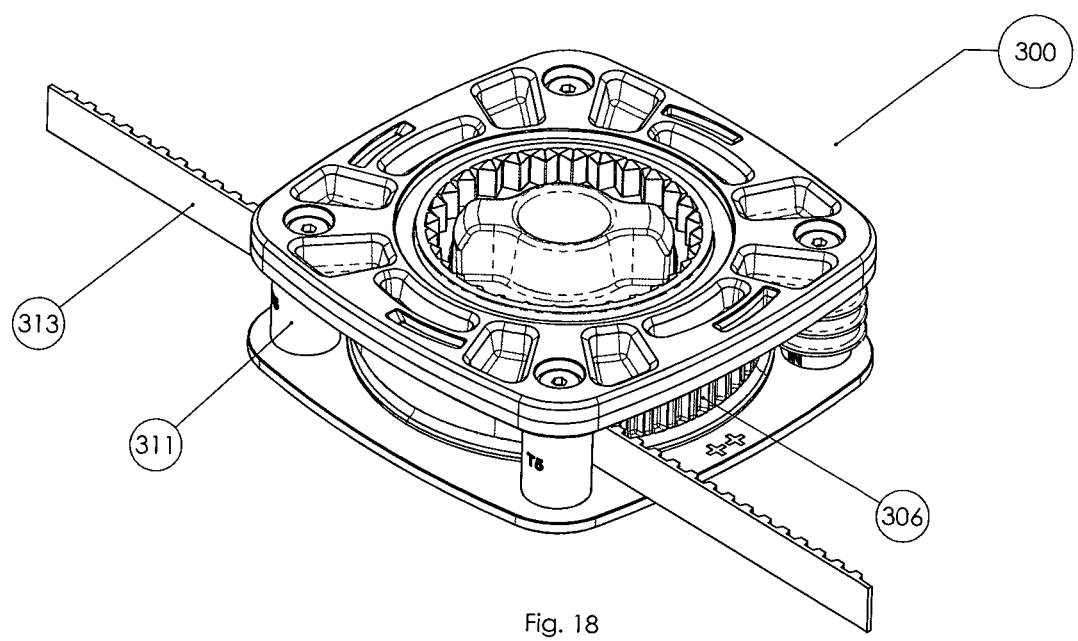
FIG. 18 illustrates a perspective view of an alternative embodiment of the linear movement assembly with a toothed belt.
Figure 19:
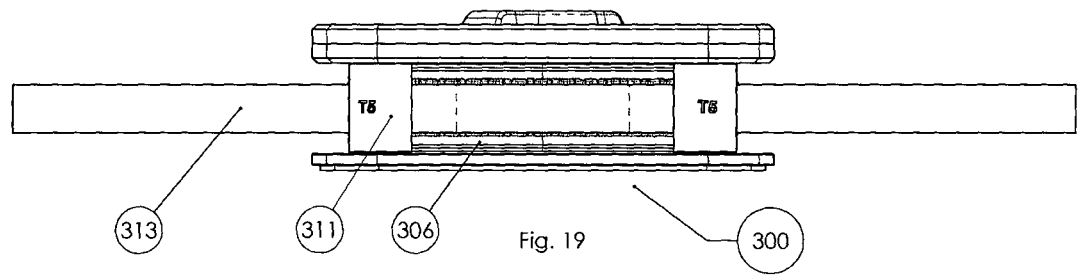
FIG. 19 illustrates a side view of the alternative embodiment of FIG. 19.
Figure 20:
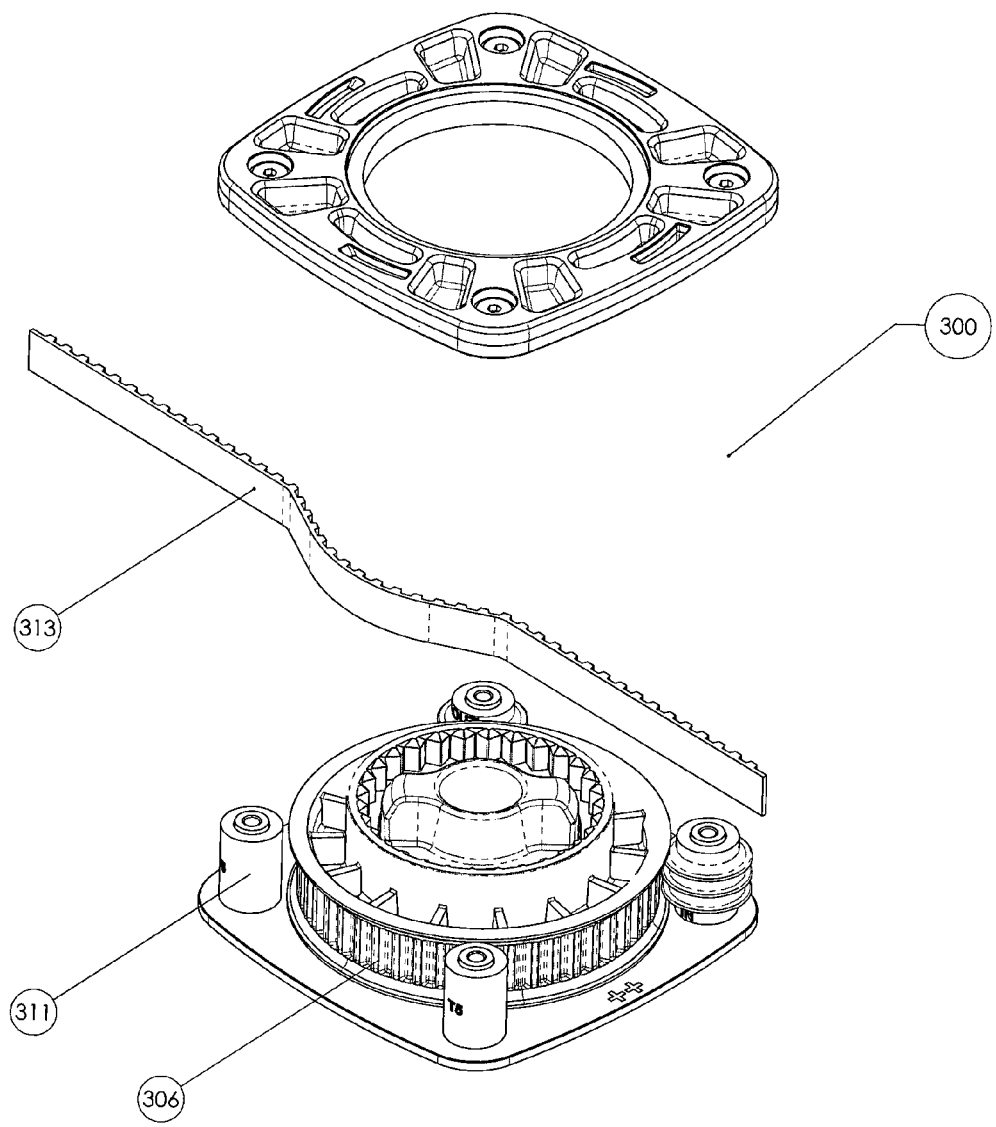
FIG. 20 illustrates an exploded view of the alternative embodiment of FIGS. 18 and 19.

FIGS. 18, 19 and 20 show perspective, side and partially exploded views respectively of the linear movement assembly 300 with a toothed belt 313 in place of rope. FIG. 18 shows a small section of toothed belt 313 passing over the flat rollers 311 and drive pulley 306. FIG. 19 shows a small section of toothed belt 313 passing behind the flat rollers 311 and over the drive pulley 306. FIG. 20 shows the toothed belt 313 in its flex position as it is would be when moving over the flat rollers 311 and the drive pulley 306.

Alternative Embodiments

The display may be any type of interactive screen such as, but not limited to a touch screen, LCD screen, ePaper screen or OLED screen.

The electrical motor may be any type of motor such as, but not limited to a stepper motor, servo motor, or DC gear motor with position encoder.

The gear box may be any type of reduction gearbox such as, but not limited to planetary, spherical, worm gear, belt reduction.

The panning movement assembly may be fully integrated into the device as opposed to being detachable.

The panning movement assembly may be combined with the linear movement assembly so it is one component, and may be used in one orientation only exposing both functions, or reversible as opposed to separate accessories.

The quick release plate may be attached by another means such as, but not limited to thumb screws, over-centre catches, magnets or a bayonet fitting.

The screw on top of the device may be a small screw into the camera and the spirit level may be replaced with an electronic level integrated through a PCB and displayed on the graphic user interface.

The computer interface port may be positioned on any of the other aspects of the device.

1.0. Description of Software

The device uses firmware stored in the permanent memory of an integrated circuit on the PCBs 501 and 502. This firmware is used to control the electrical and mechanical components of the device. The user interacts with the firmware via the graphic user interface 103, which consists of a keypad 102 and display. The main functions of the firmware is to store and access programs that the user sets up for controlling the device 100. The firmware also calculates all of the parameters needed to execute the movement and camera control functions. The firmware also has a variety of advanced functions that allow the user to perform additional features beyond basic motion and capture control. The firmware is fully updateable via a computer interface port, allowing additional features to be added by the user upon downloading the software and installing it, connecting the device to a personal computer and uploading the new firmware to the device.

The Basic Firmware Functions are Described Below:

1.1. Motor Control

The firmware controls the timing and movement of the electric motor. The firmware is capable of recording the motor position and movement values and using these to further calculate position, speed and acceleration parameters. Depending on the motor type, the firmware may send and receive digital and analog signals which provide information on the movement and position of the device. These signals may be sent and received through a variety of means. Examples of these may include a stepper motor driver being used to control a stepper motor to move in segmented steps or a servo motor which may be accurately positioned to a certain degree of rotation. A DC Motor of any type may be used with position sensor or encoder attached to provide feedback.

1.2. Camera Control

The camera may be controlled via the firmware through a variety of methods. The primary control of the shutter and auto focus on the camera is operated via a digital output on the PCBs 501 and 502. This output is connected to the camera shutter release input via a current isolation circuit that prevents direct current exchange between the camera and the device 100 micro controller. One example of how the current is isolated is by using a optocoupler. The optocoupler receives a positive voltage from the microprocessor and opens to allow the current provided from the camera shutter release port to flow, hence triggering the camera to operate the shutter. The same example is also repeated on the focus control line on the camera output. The camera and device have two isolated loops of current flow from one and other preventing possible short circuit, voltage surges or other damaging interference.

The camera also may be controlled via a variety of other means. These may include using the USB port on the camera to receive digital commands, or using an infrared emitter attached to the device 100 via the interface port 107-109 which signals the camera to perform an action via the cameras infrared receiver, if available. The device 100 may be programmed to emit various infrared signals which correspond to various camera makes and models.

Further additional model specific signal types may be added to allow for future compatibility by updating the firmware. In addition to using the interface port 107-109 for interaction with computer hardware, the interface port 107-109 also may be used for two-way communication. This may be used to control an infrared emitter or receiver, as well as any other digital or analog device. This may include radio frequency transmission and receiving radio signals, optical interfacing with cameras or other camera control equipment, cell phone network connectivity, wi-fi connectivity, local area network control. Any of these functions may be used to control a variety of consumer cameras, commercial cameras, and even custom standalone imaging systems like flatbed scanners, bare boards with image sensors, as well as medical and research imaging systems like X-ray cameras, high speed cameras, various microscopes, telescopes and any other device capable of receiving infrared commands, digital switching commands, or analog voltage control.

In addition to the camera being controlled via digital or analog electrical connection, any camera shutter mechanism may be controlled using an additional electromechanical device such as a servo, or actuator. This mechanism may be connected to the shutter release button on any camera via mechanical attachment, thus allowing the device 100 to be used on pre-electrical photographic and cinematographic equipment. The device may for example be used to control a traditional 35 mm camera, or medium format camera to take photographs, or start recording video. Provided that the camera has some kind of automatic winding apparatus, either integrated or additionally attached, the device may also record image sequences on pre electronically triggered cameras. These may be then translated into time lapse video.

1.3. Interface Port (107-109)

The interface port 107-109 may be used in a variety of ways. The current design has 4 electrical poles, each of which may be configured as INPUTS or OUTPUTS. Typically they would consist of 1 ground line, and 3 analog/digital IN/OUT lines. The device 100 is capable of switching each of the 3 lines to act in various ways depending on the control required. The design may also include a multitude of additional lines offering extended functionality, different voltage requirements, as well as enhanced support for various existing and yet to be developed data transmission protocols. These include but are not limited to, USB connectivity, fire wire connectivity, optical data transmission etc. Due to the wide range of extended capability that the accessory port adds, combined with the use of an integrated processor the options for extended functionality of the device 100 are endless.

Some of these additional functions include; image and video storage where the device may be used as a stand alone data storage unit, using built in storage capabilities such as a hard disk drive, or flash memory the device may be used as an external drive that images may be transferred to, from the recording device. The device may also be used for data processing, images may be transferred to the device in real time or by the user and then converted to various formats.

An example of this function in use would be to transfer a series of images that had been recorded at programmed time intervals and then compile these into a time lapse video. This video may then be transferred back to the recording device for playback, or viewed on the device 100 in-built LCD. Viewing these compiled images on the device would allow the user to view the progress of the recording time lapse in real time. This feature would mean that the time lapse may be checked, stopped or even altered at any stage during recording allowing for quick revision and checking which is currently unavailable.

1.4. Interface Port 107 and 108—Sensing

The Interface ports 107 and 108 may be used to sense what accessory or accessories are connected to the device 100. Using one of the analog/digital IN/OUT lines of the interface port 107 and 108 the device is able to read a voltage value. On connection of the accessory the device provides +5V to the accessory via a digital OUT line. This +5V line may be used to provide power to the accessory that is connected, as well as provide a return reference voltage to the device via a resistor.

This returned reference voltage is read on an analog IN line of the device. The voltage drop from the resistor in the accessory is read as a numeric value. This value is compared to an internally stored database inside the device's memory. The database provides the required information for the graphic user interface 103, and any other information required by the device 100 microprocessor to use the accessory.

The accessory database may hold an expandable list of accessories which may be updated via new firmware revisions, or by entering the details of the accessory using the graphic user interface 103. More advanced protocols may be used with smart accessories that enable the accessory to supply the required information to the device 100 therefore eliminating the need for accessory related firmware updating.

An example of the accessory sensing function in action is as follows:

Accessory Type A: light detecting accessory.
1. Accessory is plugged into the device.
2. The lines of the accessory port are connected as follows; Line 1—GND, Line 2—+5V, Line 3—analog IN, Line 4—Not set.
3. The device reads the voltage returned on LINE 3 (3.30V)
4. The processor compares the returned value to the stored values.
5. The processor recognises the accessory as a light detector.
6. The processor switches LINE 4 to Analog IN and displays the user changeable settings for the accessory on the Graphic User Interface (These may include adjusting the sensitivity of the light meter etc)

Another example of the same sequence of events used with a different accessory is as follows:

Accessory Type B: infrared emitter accessory.
1. Accessory is plugged into the device.
2. The lines of the accessory port are connected as follows; Line 1—GND, Line 2—+5V, Line 3—analog IN, Line 4—Not set.
3. The device reads the voltage returned on LINE 3 (3.80V).
4. The processor compares the returned value to the stored values.
5. The processor recognises the accessory as an infrared emitter.
6. The processor switches LINE 4 to digital OUT and displays the user changeable settings for the accessory on the graphic user interface. These may include the type of infrared signals to be used, for example the make and model of the external apparatus that the emitter would be used to control.

Some of the other accessories that may be used are; motion sensing, sound sensing, external keypad, joystick for movement control, shutter release cable, an additional device connected in series, a secondary camera shutter control, camera flash controller, wireless interface, vibration detection, laser beam switch, speed controller, radio receiver, any sort of device that is able to send or receive digital or analog signals, humidity sensor, virtually any device capable of providing or receiving low voltage electrical commands.

2.0 Software and Hardware Interaction

The following describes the software and hardware interaction. This will be divided into various sections which outline the calculations that the microprocessor will execute and how information is passed between each of the various components on the circuit board.

The software is primarily divided into two sections. The first section is the graphic user interface 103 (front end). An example of how the graphic user interface 103 menu structure may be laid out has been given in the previous section of the document. The GUI provides a link between an external user interacting with the device 100 and the changeable variables required to be set to alter how the device 100 operates. The other section of the software (back end) is used to calculate and control the various components on the board to interact in a way that matches the specified outcomes the user has entered. The user set variables are taken by the microprocessor to calculate additional information for movement and shot sequencing.

Functions covered in the following text and diagrams are as follows:

2.1. Recording Sequence

The following explains the logical sequence and flow of information which occurs when the recording is begun.

Recording parameters passed to the Microprocessor

Microprocessor calculates values required for Recording to begin.

Start timer delay

Recording loop begins and continues until complete or interrupted by user

Motor moves

Delay—Move shoot

Camera interface port signaled to take one shot

Delay—Interval between shots

Ramp in/Out Calculation

The Ramp In/Out Calculation is made by the microprocessor and the required movement for each shot is spread across the each of the shots required.

2.2. Saving a Preset

When the user has entered all the parameters that are required for the recording they may then save it as a preset. The processor logic for saving a preset is as follows.

User enters save name

Save name and variables saved to memory

Additional menu item added to CHOOSE Recording Menu 2.3. Sensor Recognition

When a an external sensor has been attached to the device via the interface port 107/8/9, the device is capable of reading the sensor type by comparing a value to a stored database. The processor logic is as follows.

Microprocessor reads the sensor port

Analogue voltage is received as digital integer

Integer is compared to stored values

Matching stored value provides microprocessor with additional sensor information.

2.4. Auto Start

Microprocessor reads auto start condition.

Timer ON

Micro waits

Timer OFF

Sensor ON

Micro waits for sensor input

Sensor OFF

Micro starts recording 2.5. Battery Voltage Reading

Micro reads battery voltage via charger

Micro displays battery voltage via LCD 2.6. Motor Control

Micro sends motor direction to motor controller

Micro sends motor steps to motor controller

Motor moves specified steps 2.7. Mount Plate Recognition

Micro reads hall effect sensors

Micro compares values to stored database

Micro runs appropriate menu layout on graphic user interface 103

3.0 Graphic User Interface Menu Structure and Program Features

The graphic user interface 103 is used to give the user easy access to setting up the device 100 to perform all of its programmed features. The firmware used to run the device 100 may be changed to be used in a variety of ways, not limited to photography, but the following covers the core functions of how the user would navigate the Camera control firmware using the graphic user interface 103. This will also help explain how the device 100 is designed to work and what differentiates it from other devices.

Starting by explaining the process that the user goes through to setup each of the various functions of the device 100 from "power on" till "power off".

By pressing the power button 114 the power supply circuit switches "on" and provides electrical current to the microprocessor and other parts of the PCB—or in the case of the current prototype PCBs 501 and 502. The microprocessor runs the firmware that is stored in the program memory and the various parts of the PCBs 501, 502 come to life. The display 103 turns on and the keypad 102 becomes active. Once the required information has been loaded into the memory a graphic user interface 103 is displayed on the display 103. This graphic user interface 103 may consist of a variety of menu items, tabs, icons, or various other graphical or text based information which may be, for information purposes, aesthetic purposes, selectable, editable or otherwise viewable or interactive.

For the purpose of this specification a text based example of a graphic user interface 103 is described. The current menu structure should be seen as a guideline to examine each of the features.

Each separately displayed page of the menu is tabbed inwards to form a tree diagram similar to that found in a directory tree commonly used for navigating files and folders on a personal computer.

3.1 Power on Menu

On 'Power ON' and menu startup the graphic user interface 103 opens the menu at the welcome screen.

---
SYRP
welcome screen
Begin
System Settings

---

In this screen the user may select 1 of 2 options. BEGIN, or SYSTEM SETTINGS. When SYSTEM SETTINGS is selected the menu is navigated back up the menu tree to the SYSTEM SETTINGS menu ---
SYSTEM SETTINGS
About
Backlight Timer 5s
Backlight Brightness (1 - 10)
Sound On
Date Format DD/MM/YYYY
Date 12/10/2011
Time 22:15Units (Metric, imperial)
Reset All Settings
RESET ALL SETTINGS OK?
Save
Exit

---

3.2. System Settings Menu

Now in the SYSTEM SETTINGS menu the user may navigate through the various parameters and alter them using the integrated keypad 102 on the device 100. This menu is placed in a backward position i.e above the entry point into the menu, because it is intended that the user will only need to change these settings once on initial setup, and then very occasionally thereafter. The following parameters may be viewed and/or changed:

About.

This item does not perform any particular function, but instead offers the option of showing device 100 information like the model number, firmware revision, usage data, user warnings, service information etc.

Backlight Timer.

This adjusts the length of time that the backlight remains on after there has been any user interaction. This function helps conserve battery by automatically turning off the backlight on the display to reduce power consumption.

Backlight Brightness.

Assuming that the device 100 is using a display that has the capability of brightness adjustment, this setting adjusts the brightness of the display. The range 1-10 has been used as guide numbers which the maximum and minimum brightness values will be mapped across. This may also be displayed graphically, using a bar graph, pie graph, or icons for example.

Sound.

This will be used to select if the unit will provide audible feedback. The settings for this may be ON/OFF, a volume adjustment number, graph or icon, or various other options like switching the sound on or off for a variety of individual features like button press beeps, warning tones, or startup and shutdown sound for example.

Date Format.

This is used to change the input format for the date, DD/MM/YYYY or MM/DD/YYYY for example.

Date.

The date may be setup on the device 100.

Time.

The current time may be setup on the device 100. The Date and Time settings are required in order to use the advanced timer auto start functions mentioned later in the menu.

Units.

These may be set depending on the users current region, or personal preference. When changed all units used throughout the user interface will be converted to the chosen type.

Reset all Settings.

This item resets all of the device 100 settings to the factory preset. A secondary menu is displayed to confirm that the user wants to reset all settings. Once actioned all settings in the device 100 will return to those that were set prior to purchasing.

Save.

Changes are saved to the permanent memory on the Device and will remain saved after the power is turned off.

Exit.

When selected the current menu is exited and the graphic user interface 103 returns to the welcome screen.

3.3. Choose Recording Menu

If while on the welcome screen the user chooses the begin menu item they are taken to the CHOOSE RECORDING menu.

| CHOOSE RECORDING |
| --- |
| New Recording |
| Clouds Time Lapse |
| Preset Time Lapse 1 |
| Preset Time Lapse 2 |
| Preset Time Lapse 3 |
| Auto Start |

In the CHOOSE RECORDING menu the user is given a new list of selectable items, these again may be text items, or other graphical items like icons for example. As with the previous menu page the user may navigate through the menu items using the integrated keypad 102, or using an external joystick, or external keypad, or an integrated touch screen interface if attached. A short description of the menu items are described as follows:

New Recording.

Selecting this item takes the user in a new menu direction where all the parameters of a new recording may be setup.

Clouds Time Lapse, Preset Time Lapse 1, Preset Time Lapse 2, Preset Time Lapse 3.

These menu items represent user presets. When selected these menu items take the user to a new menu which displays preset recording variables that have been saved by the user or supplied with the device from the factory. There may be more or less presets depending on user requirements of preference.

Auto Start.

This menu item allows the user to setup the device 100 to automatically begin running any of the preset programs, including the last used New Recording settings.

3.4. Recording Mode Menu

Inside the 3 unique CHOOSE RECORDING menu items (New Recording, Presets, and Auto Start) there are a variety of parameters and sub menus that may be modified to control the recording sequence of the Device 100. These will be described further in the following pages.

When New Recording is selected The RECORDING MODE menu is displayed. In this menu the user is prompted to choose the recording type they would like to setup.

| New Recording |
| --- |
| RECORDING MODE |
| Time Lapse |
| Continuous Shots |

The two options available are Time Lapse, and Continuous. By selecting Time Lapse recording mode the user is taken to a new menu that displays the various parameters available for setting up a Time Lapse recording. In a Time Lapse recording the Device 100 may be programmed to move any amount from zero upwards, in either degrees, or in distance (Metric or Imperial). The degree or distance will later be divided up into movement steps per shot by the microprocessor. The device 100 will also be programmed to signal the camera to fire a single shot after each of these movement steps. It should be noted that the option may also be added to have the camera fire multiple shots at each of the movement intervals. The time between each of the device 100 movements and camera shot signals is setup using a variety of parameters.

If the user selects the Continuous Shots mode the device 100 will be programmed to hold the camera shutter (or other device plugged into the camera port) open. Depending on the camera setup this may result in multiple images being captured for as long as either the device 100 signals the camera to continue, or until the camera has reached its maximum shots. It may also be used to hold the shutter open for a long exposure at a specified time controlled by the device 100. The user may also program device 100 movement to accompany the shutter action command being sent to the camera. The Device movement in Continuous Shots mode, remains fluid and is not segmented into a move stop wait sequence as it is in Time Lapse mode. This means that the Continuous Shots mode may also be used for smooth video capture using a traditional video camera. The device 100 travel distance or angle may be programmed for the user to achieve endlessly repeatable, smooth and controlled, tracking, panning and other types of moving video shots.

3.5. Time Lapse Recording Menu

The Time lapse menu offers the following parameters

| Timelapse |
| --- |
| TIMELAPSE SETTINGS |
| Rec Time xxh:xxm:xxs |
| Play Time xxh:xxm:xxs |

-continued

> Movement xxx deg
> Ramp in / out xs
> Advanced Setup
> Interval 15s
> Playback Speed X10
> Min Shutter Speed 10s
> Save as new preset
> Preview
> Start Each of these parameters are further explained below:

Rec Time.

Sets the total time the recording will run for on the device 100, this is entered by selecting and navigating through the time variables till the desired time frame is entered. The user enters how long they would like the device 100 to actively control the apparatus attached to it.

Play Time.

Sets the time that the user would like the compiled time lapse video to play back in.

An example of how the two above values interact is as follows. The user sets the Rec Time to 1 hr, then sets the playback time to 30 seconds. The Microprocessor calculates the amount of individual images that are required to be captured by the attached camera, and the time between each image being captured to ensure that the camera records enough images for the user to be able to compile a time lapse video that will play back at the chosen frames per second (fps, the frame rate may be adjusted in the advanced setting that will be discussed at a later stage of the document) over the time period specified in the Play Time parameter. This makes setup easy and intuitive; simply put in how long you want to record for and how long you want you final video length to be and the microprocessor calculates the rest.

Movement.

Sets the amount of movement made by the Device 100 during the recording. This would be displayed as a distance or an angle depending on which mounting accessory was attached to the device 100—hall effect sensors 506 or other electrical sensor, reads the accessories type. In the currently shown menu structure the Movement item takes the user to a new menu where they may input the values by moving the unit. Further explanation of this will be given in more detail.

Ramp in/Out.

This is where the user sets the amount of time that the unit accelerates and decelerates to the calculated running movement speed of the device 100 during a recording. Real time values (Play Time) are used so that the user may easily adjust how the start and end of their programmed movement will look.

If for example they set the Ramp in/out to 3 seconds; when they compile the images captured after the recording or when using the preview function, the device 100 will accelerate from 0 to the required constant movement speed over the first 3 seconds of the compiled Time Lapse video (or movement preview function), and then decelerate from its constant speed back to 0 over the last 3 seconds of the compiled Time Lapse Video (or movement preview function).

During the capture of the Time Lapse these changes in velocity are adjusted into the segmented movement of the device 100 between shots, which is in turn actioned as a gradual change in movement distance/angle between shots until the continuous movement distance/angle is achieved, and then a reduction in movement between shots at the end of the Rec Time.

Advanced Setup.

The advanced setup takes the user to a new menu with additional parameters that may be adjusted to fine tune the program. It is expected that these settings will need to be adjusted less often than those in the current menu. More information on the Advanced settings will also be given later in the document.

Interval.

This displays the time between each of the shots that are to be taken during the recording. In the current menu structure this is given as a reference value but is not editable. Traditionally this was used as the primary value to be changed when setting values for time lapse recording. The same menu layout and background calculations may be adapted to make this a driving unit for setting the device 100. The current value is calculated from the Rec Time, Play Time and Frame Rate (Advanced Settings).

Playback Speed.

This displays the relative difference between the recording time, and the play time of the final compiled time lapse video. In the noted menu structure in this document the value is a calculated by the Rec Time and Play Time. This may also be used as a driving value to change the speed at which the compiled time lapse video is sped up by. An example of how the current use would be displayed would be; The Rec Time is set to 30 minutes and the Play Time is set to 20 seconds. The Playback speed would be displayed as 90×, showing that the final video would be played back at 90 times than the actual recorded speed, in most cases this value would be subject to rounding as the exact value is not necessary when used in most situations.

Minimum Shutter Speed.

This displays the slowest possible shutter speed that should be used on the camera to ensure that the device 100 does not move when the image is being captured, or signal the camera to capture another image before the current image has finished being exposed. This value is calculated from the remaining time left in the interval between shots after the device 100 movement time has been subtracted. An example of this is; The device 100 interval (time between each shot) is 10 seconds. The time it takes the device 100 to move to its next position between each interval is 1 second. The minimum shutter speed (slowest shutter speed/longest exposure) that would avoid interference would therefore be approximately 9 seconds (The actual time would be slightly less than this when other parameters are also added into this equation, and a factor of safety is presumed).

Save as a New Preset.

This gives the user the option to save the settings in this menu as a new preset. The preset will be added to the CHOOSE RECORDING menu. The user also has the option to add a custom name to the recording.

Preview.

When the user selects preview, the graphic user interface 103 enters a new menu which displays various information about the recording, and then begins to move the device 100 at the real time playback speed (the speed the device 100 will be moving in the compiled time lapse video). This allows the user to quickly access how the movement in the final video will look. The device 100 will not trigger the camera to fire its shutter during the preview sequence, but it will accurately replicate the speed, acceleration, and stop at the final end point of the recording.

Start.

When start is navigated to and selected, the device 100 will begin to action the parameters that the user has inputted as a sequence of movements and outputs to one or all of the interface ports 107, 108, 109. In a typical motion time lapse recording the Camera attached to the device 100 will be commanded to take a single shot. The device 100 will then wait for the maximum amount of time available before moving (this will allow the camera the widest range of exposure time). The device 100 will move the calculated segment of movement, stop, and then repeat the cycle until the device 100 has traveled the specified distance or angle or completed the capturing of the required shots in the time frame specified in the Rec Time parameter. If the movement specified in the Movement parameter was set to zero, the same cycle would be repeated throughout the Recording but the device 100 would not move between shots.

3.6. Time Lapse Setting Menu

Detailed description of extended TIME LAPSE SETTING menu parameters.

```
                    MOVEMENT
              Clockwise (Counter clockwise)
                    Angle xx deg
                   Set using Keypad
                  SET START POINT
                  {Keypad Graphic}
                   SET END POINT
                  {Keypad Graphic}
                  ADVANCED SETUP
  Frame rate xxfps (16fps, 24fps, 25fps, 30fps, 50fps,60fps)
                   Auto Focus x.xs
                 Move Shoot Delay x.xs
                      PREVIEW
                    Pause Preview
                   PREVIEW PAUSED
                   Continue Preview
              Return device to start point
                  Preview Starts in 03s
                     RECORDING
                   Pause Recording
                   RECORDING PAUSED
                  Continue Recording
                    Stop Recording
                Time Elapsed 1h:30m:00s
                    Shots Taken 2800
                 Distance Travelled 120 cm
                Time Remaining 4h:00m:00s
                  Shots Remaining 1200
                 Distance Remaining 50cm
                  Recording starts in 03s
                Time Elapsed 00h:00m:00s
                     Shots Taken 0
                  Distance Travelled 0 cm
                Time Remaining 5h:30m:00s
                  Shots Remaining 4000
                 Distance Remaining 170cm
```

The above list shows the additional submenu items taken from the TIME LAPSE SETTING menu, the following outlines in more details how the user interacts with each of the items, and offers an extended description of the purposes of the additional menu items.

3.6.1 Movement Submenu.

This Menu Contains the Following:

Direction Place Holder.

The direction setting (currently displayed in the Panning mode format) lets the user set which direction the device 100 will move. In Panning mode as it is displayed here, the user may set the parameter to either Clockwise or Counter Clockwise.

When the device 100 has a mounting plate accessory attached that is designed to move the device 100 in a linear direction the parameter options would be displayed as forward and backward, or may also be displayed as up and down, or left and right for example.

Angle/Distance.

This is where the user enters the angle or distance (only one option will be shown depending on which mounting plate accessory the device 100 is attached to). The user may change this setting and the microprocessor will use this to calculate the device 100 movement required during the recording.

Set Using Keypad.

As an alternative to entering the distance or angle that the device 100 will move during the recording, the user may use the integrated keypad 102 to move the device 100 to the start position. The device 100 will record this position, then the user may move the unit to the end position, and the device 100 will record this position. The movement commands are executed by using the integrated keypad 102, or an external control device such as computer, keypad, or joystick. When the internal drive motor 113 used is of the type that may provide feedback to the device 100 processor, the user may manually move the device 100 by means of rotation, or linear movement if used in a linear mode, and the microprocessor will record the distance that the device 100 has moved.

10.6.2 Advanced Setup Submenu.

The advanced setup offers the user additional features that are not intended to be changed often, but yet are important variables for proper use. The following parameters may be adjusted by the user.

Frame Rate.

This setting tells the microprocessor what frame rate the final compiled video is going to be played at. This parameter is used to calculate the total number of shots needed to be taken over the recording time frame. The user may choose from a variety of pre defined frame rates that are considered to be standards for video production. This value may also be set as a variable that may be changed to any whole number, or decimal value.

Auto Focus.

This setting adjusts how long the device 100 signals the focus output on the Camera interface port 107/108/109. The user may set this value in seconds using a decimal variable. This value is used in conjunction with other values to form the fully defined recording Time Line which is segmented into the recording sequence. If the value was set to zero then the device 100 would not signal the camera to auto focus.

Move Shoot Delay.

The move shoot delay function is incorporated into the movement and capture sequence to ensure that the device 100 has stopped moving completely before triggering the camera to capture and image. The longer the value, the longer the device 100 waits between movement and the start of image capture. A longer time frame will ensure that all post device 100 movement, shaking, or vibration has settled before image capture. This value is incorporated into the interval calculations required to divide the Recording into single image time lapse segments.

3.6.3 Preview Sub Menu

When the Preview menu item is navigated to and selected, the Microprocessor begins to run the preview sequence. As part of the preview sequence a delay is placed into the program to add an extra degree of safety to the device 100, this delay may be changed in the firmware programming to any theoretical value. For this example we will presume that a delay of 3 seconds has been programmed into the device. Once the device 100 has entered the preview menu it will wait for 3 seconds, reducing the displayed time value that recording starts until it reaches 0. Once this time has been reduced to zero the device 100 begins to move the distance or angle specified in the setup parameters at a speed at which it will complete its movement in the Play Time also specified in the setup parameters. The microprocessor will calculate the required acceleration, constant speed, and deceleration to required to move the device 100 in the same way which would be expected to be seen in the final compiled time lapse video. A description of each of the menu items follows.

Pause Preview.

This is the only selectable menu item in the Preview menu. Pressing any key on the integrated keypad 102 will pause the preview, the preview may also be paused if the user was controlling the menu structure from an externally connected keypad or joystick. When the Preview has been paused the graphic user interface 103 moves into another menu which displays two options to the user, Continue Preview and Return Device to Start Point. Pressing continue starts the device 100 moving again and it will continue at its previous path until the remaining portion of the preview is completed. Choosing Return Device to Start Point tells the microprocessor to return the device 100 back to the point that it was at before the preview had begun. Once the device 100 has finished the preview sequence or it has been returned to the start position, the Preview menu will then be exited and the graphic user interface 103 will return to the Time Lapse Settings Menu.

There is also a countdown timer present which shows the time remaining until the preview begins. This may be used in conjunction with an audible tone, Display iconography, or flashing LED's which further indicate to the user that the device 100 is about to begin a preview sequence.

3.6.4 Recording Submenu

When the Start Recording menu item is navigated to and selected, the Microprocessor begins to run the Recording sequence. As part of the Recording sequence a delay is placed into the program to add an extra degree of safety to the device 100. This delay may be changed in the firmware programming to any theoretical value. For this example we will presume that a delay of 3 seconds has been programmed into the device 100. Once the device 100 has entered the Recording menu it will wait for 3 seconds, reducing the displayed time value that Recording Starts until it reaches zero. Once this time has been reduced to zero, the device 100 begins to move and signal the camera to capture images at the calculated intervals. The microprocessor will calculate the required movement and shot timing based on the parameters entered in the setup. A description of each of the menu items in the Recording menu follows:

Pause Recording.

This is the only selectable menu item in the Recording menu. Pressing any key on the integrated keypad 102 will pause the recording, the recording may also be paused if the user was controlling the menu structure from an externally connected keypad or joystick. When the recording has been paused the graphic user interface 103 moves into another menu which displays two options to the user, Continue Recording and Stop Recording.

Pressing continue starts the recording sequence from the previously stopped position and it will continue on its previous path until the remaining portion of the recording is completed. Choosing Stop Recording tells the microprocessor to stop the recording. Once the device 100 has finished the recording sequence or it has been stopped, the Recording menu will be exited and the Graphic User Interface will return to the Time Lapse Settings Menu.

3.6.5 Recording Statistics.

During the recording the microprocessor updates various statistics that inform the user of the progress that the device 100 is making. Any of the variables stored in the microprocessors memory may be displayed on the display, and these may be added to or removed by updating the firmware, or adding additional functionality to the firmware to allow for user updatable menu items. The recording statistics are viewable while the recording sequence is running, and while the recording sequence is paused. A description of the variables is as follows.

Time Elapsed.

displays the time that the recording has been running for.

Shots Taken.

displays the total number of times that the device 100 has signalled the camera interface port 107/108/109 to tell the camera to capture an image.

Distance Travelled.

displays the distance that the device 100 has travelled since the recording began. In Panning mode this would be displayed as an angle rather than distance.

Time Remaining.

displays the time remaining until the recording has completed.

Shots Remaining.

displays the number of images that are still to be captured before the time lapse recording has completed.

Distance Remaining.

displays the distance that the device 100 has yet to travel before the recording sequence completes. This would be shown as degrees of movement when the device 100 is used in panning mode.

3.7. Continuous Shots

The Continuous Shots menu offers the following parameters

| Continuous Shots |
| --- |
| CAPTURE SETTINGS |
| Capture Time xxm:xxs |
| Movement xxx deg |
| Ramp in / out xs |
| Advanced Setup |
| Preview |
| Save as new preset |
| Start |

Each of these parameters are further explained below:

Capture Time.

Sets the total time the recording will run for on the device 100, this is entered by selecting and navigating through the time variables till the desired time frame is entered. The user enters how long they would like the device 100 to actively control the apparatus attached to it.

Movement.

Sets the amount of movement made by the device 100 during the recording, This would be displayed as a distance or an angle depending on which mounting accessory was attached to the device 100 (hall effect sensor 506 or other electrical sensor, reads the accessories type). In the currently shown menu structure the Movement item takes the user to a new menu where they may input the values by moving the unit, further explanation of this will be given in more detail.

Ramp in/Out.

This is where the user sets the amount of time that the unit accelerates and decelerates up and down to the calculated constant speed of the device 100 during a recording. If for example the user sets the Ramp in/out to 3 seconds the device 100 will accelerate from 0 to the calculated required constant movement speed over the first 3 seconds of the recording and then decelerate from its constant speed back to 0 over the last 3 seconds of the recording.

Advanced Setup.

The advanced setup takes the user to a new menu with additional parameters that may be adjusted to fine tune the program. It is expected that these settings will need to be adjusted less often than those in the current menu. More information on the Advanced settings will also be given.

Save as a New Preset.

This give the user the option to save the settings in this menu as a new preset. The preset will be added to the CHOOSE RECORDING menu. The user also has the option to add a custom name to the recording.

Preview.

When the user presses preview the graphic user interface 103 enters a new menu which displays various information about the recording, and then begins to move the device 100, but does not trigger the camera to begin capturing images. Although the device 100 will not trigger the Camera to fire its shutter during the preview sequence, it will accurately replicate the speed, acceleration, and stop at the final end point of the recording.

Start.

When start is navigated to and selected, the device 100 will begin to action the parameters that the user has inputted as movements and outputs to one or all of the interface ports 107/108/109. In a typical continuous shots recording the Camera attached to the device 100 will be sent a command to take a single continuous shot (the same as pressing and holding down the shutter button on the camera). While doing this the device 100 will move at a constant speed, or at a variable speed depending on the Ramp In/Ramp Out parameters until the device 100 has traveled the specified distance or angle in the time frame specified in the Rec Time parameter. If the movement specified in the Movement parameter was set at zero, the device 100 would not move while signaling the camera to capture.

Detailed description of extended CAPTURE SETTINGS menu parameters.

---
MOVEMENT
Clockwise (Counter clockwise)
Angle xx deg
Set using Keypad
SET START POINT
{Keypad Graphic}
SET END POINT
{Keypad Graphic}
ADVANCED SETTINGS
Auto Focus x.xs
PREVIEW . . .
Pause Preview
PREVIEW PAUSED
Continue Preview
Return device to start point
Preview Starts in 03s
SAVE AS
Continuous 1_____45s/75deg
RECORDING
Pause Recording
RECORDING PAUSED
Continue Recording
Stop Recording
Time Elapsed 00m:42s
Shots Taken 500
Distance Travelled 70 deg
Time Remaining 00m:3s
Shots Remaining 20
Distance Remaining 5 deg
records starts in 03s
Time Elapsed 00m:42s
Shots Taken 50
Distance Travelled 70 deg -continued Time Remaining 00m:3s
Shots Remaining 20
Distance Remaining 5 deg

---

The above list show the additional submenu items taken from the CAPTURE SETTINGS menu, the following outlines in more details how the user interacts with each of the items, and offers an extended description of the purposes of the additional menu items.

3.8. Movement Menu

This Menu Contains the Following:

Direction Place Holder.

The direction setting (currently displayed in the Panning mode format) lets the user set which direction the device 100 will move. In Panning mode as it is displayed here, the user may set the parameter to either Clockwise or Counter Clockwise. When the device 100 has a mounting plate 312 accessory attached that is designed to move the device 100 in a linear direction. The parameter options would be displayed as forward and backward, or may also be displayed as up and down, or left and right for example.

Angle/Distance.

This is where the user enters the angle or distance (only one option will be shown depending on which mounting plate 312 accessory the device 100 is attached to). The user may change this setting and the microprocessor will use this to calculate the device 100 movement required during the recording.

Set Using Keypad.

As an alternative to entering the distance or angle that the device 100 will move during the recording, the user may use the integrated keypad 102 to move the device 100 to the start position. The device 100 will record this position, then the user may move the unit to the end position, and the device 100 will record this position.

The movement commands are executed by using the integrated keypad 102 or an external control device 100 such as computer, keypad or joystick. When the internal drive motor 113 used is of the type that may provide feedback to the device 100 processor the user may move the device 100 by means of rotation, or linear movement if used in linear mode, and the microprocessor will record the distance that the device 100 has moved.

3.9.10.9 Advanced Setup Menu.

The advanced setup offers the user additional features that are not intended to be changed often, but yet are important variables for proper use. The following parameters may be adjusted by the user.

Auto Focus.

This setting sets the device 100 to signal the focus output on the Camera interface port 107/108/109. The user may set this to on or off in continuous mode.

4.0 Preview Menu.

When the Preview menu item is navigated to and selected, the Microprocessor begins to run the preview sequence. As part of the preview sequence a delay is placed into the program to add an extra degree of safety to the device 100. This delay may be changed in the firmware by programming it to any theoretical value. For this example we will presume that a delay of 3 seconds has been programmed into the device 100. Once the device 100 has been signalled to start the preview, it will wait for 3 seconds, counting down the displayed time value that Recording Starts. Once this time has been reduced to zero, the device 100 begins to move the distance or angle specified in the setup parameters at a speed at which it will complete its movement in the Rec Time also specified in the setup parameters. The microprocessor will calculate the required acceleration, constant speed, and deceleration needed to move the device 100 in the same way which would be expected to be seen in the actual continuous recording. A description of each of the menu items follows.

Pause Preview.

This is the only selectable menu item in the Preview menu. Pressing any key on the integrated keypad 102 will pause the preview. The preview may also be paused if the user was controlling the device 100 from an externally connected keypad or joystick. When the Preview has been paused the graphic user interface 103 moves into another menu which displays two options to the user, Continue Preview and Return Device to Start Point.

Pressing continue starts the device 100 moving again and it will continue at its previous path until the remaining portion of the preview is completed. Choosing Return Device to Start Point tells the microprocessor to return the device 100 back to the point that it was at before the preview had begun. Once the device 100 has finished the preview sequence or it has been returned to the start position, the Preview menu will then be exited and the graphic user interface 103 will return to the Capture Settings Menu.

4.1 Recording Menu.

When the Start menu item is navigated to and selected, the Microprocessor begins to run the Recording sequence. As part of the Recording sequence a delay is placed into the program to add an extra degree of safety to the device 100. This delay may be changed in the firmware programming to any theoretical value. For this example we will presume that a delay of 3 seconds has been programmed into the device 100. Once the device 100 has entered the Recording menu it will wait for 3 seconds, reducing the displayed time value that Recording Starts until it reaches zero. Once this time has been reduced to zero, the device 100 begins to move as well as signals the camera to continuously capture. The microprocessor will calculate the required movement and speed based on the parameters entered in the setup. A description of each of the menu items in the Recording menu follows.

Pause Recording.

This is the only selectable menu item in the Recording menu. Pressing any key on the integrated keypad will pause the recording. The recording may also be paused if the user was controlling the menu structure from an externally connected keypad or joystick. When the recording has been paused the graphic user interface 103 moves into another menu which displays two options to the user, Continue Recording and Stop Recording.

Pressing continue starts the recording sequence from the previously stopped position and it will continue on its previous path until the remaining portion of the recording is completed. Choosing Stop Recording tells the microprocessor to stop the recording. Once the device 100 has finished the recording sequence or it has been stopped, the Recording menu will be exited and the graphic user interface will return to the Time Lapse Settings Menu.

Recording Statistics.

During the recording the microprocessor updates various statistics that inform the user of the progress that the device 100 is making. Any of the variables stored in the microprocessor may be displayed on the display, and these may be added to or removed by updating the firmware, or adding additional functionality to the firmware to allow for user updatable menu items. The recording statistics are viewable while the recording sequence is running, and while the recording sequence is paused. A description of the variables is as follows.

Time Elapsed.

displays the time that the recording has been running for.

Distance Travelled, displays the distance that the device 100 has travelled since the recording began. In Panning mode this would be displayed as angle rather than distance.

Time Remaining.

displays the time remaining until the recording has completed.

Distance Remaining.

displays the distance that the device 100 has yet to travel before the recording sequence completes. This would be shown as degrees of movement if the device 100 was used in panning mode.

4.2 Recording Presets

One of the advantages of the device 100 over existing motion control equipment is the ability of the user to load existing preset parameters. These are used to quickly setup the device 100 so the user may begin recording sooner. The user saved parameters are also added as presets. For explanation purposes the following will explain the parameters shown in a preset called CLOUD TIME LAPSE.

---

Clouds Time Lapse
CLOUD TIME LAPSE
Start
Preview
Rec Time xxh:xxm:xxs
Play Time xxh:xxm:xxs
Movement xxx deg
Ramp in / out xs
Frame rate xx
Auto Focus x.xs
Move Shoot Delay x.xs
Interval 15s
Playback Speed X10 Min Shutter Speed 10s
Edit

---

On entering the Clouds Time Lapse saved preset menu, the user is presented with 3 selectable menu items, and a variety of displayed variables. The selectable items are as follows, Start.

This begins the preset recording. The user interface 103 enters the recording screen and the recording sequence begins. This is the same menu as is displayed when the new recording starts, only with the current presets values.

Preview.

This begins a motion preview that shows the movement that the device 100 will have during the recording, but in real time speed. The menu displayed will be the same as used for the preview function in the new recording, but instead the selected preset values are displayed.

Edit.

In the edit function the user is taken to a new screen where they may edit the parameters in the preset. This is a similar layout to the new time lapse recording settings which are adjusted when setting up a new recording. More details on these will be given further in the document.

The other parameters on display in this menu are used as reminders for the user so they know what preset is setup and how the shot will look. These are as follows.

Rec Time.

This shows the total time the recording will take to capture all of the images required, and move the distance specified.

Play Time.

This shows how long the compiled time lapse video will be when each of the captured frames are played back at the specified frame rate.

Movement.

This shows the distance, or angle that the device 100 will move during the recording.

Frame Rate.

This displays the frame rate used to calculate the Rec Time/Play Time relationship.

Auto Focus.

Indicates if the auto focus on the attached photographic apparatus will be triggered and for how long.

Move Shoot Delay.

Indicates the time the device 100 will wait between moving and signalling the camera to capture an image.

Interval.

Indicates the total time between each of the images captured by the camera.

Playback Speed.

This is the relative change in speed between the time that the recording will take and the time that the compiled time lapse video will take to be played back.

Minimum Shutter Speed.

This shows the minimum shutter speed (slowest speed) that may be set on the camera to ensure that the device 100 does not move while the Camera is still capturing light.

In the menu layout example given there are also 4 other presets available these are for reference, they may be renamed, deleted or added to by the user. If selected, the user will be taken to the same menu as explained for the Cloud Time Lapse, but the heading name and stored values would represent that of the chosen preset.

4.3 Auto Start Functions

The auto start function allows the user to set up the device 100 to automatically begin recording by running any of the saved presets or the previously used settings in the New Recording. The auto start may be activated using a predefined time, or an external input. The external input is received via the 2nd interface port 108. Further information on each of the menu items and how the user interacts with them is given in the following.

---
Auto Start
AUTO START
Timer on
Dxx/Mxx/Yxxxx
xxh:xxm:xxs
Sensor on
Light Sensor
Post Recording Return home (return home, power off, do nothing)
Preset: Clouds Time Lapse
Start
Rec Time xxh:xxm:xxs
Play Time xxh:xxm:xxs
Movement xxx deg
Ramp in / out xs
Frame rate xx
Auto Focus x.xs
Move Shoot Delay x.xs

---

Timer.

This parameter sets if the device 100 will use a timed delay to trigger it to start.

DD/MM/YYYY.

This is where the user sets the day, month, year, and time that they would like the device 100 to start recording.

HH:MM:SS.

This is where the user sets the start time that the unit will begin recording.

Sensor.

This is where the user sets if the device 100 will wait for a sensor input before beginning a recording.

Sensor Type.

This parameter shows the current sensor type that is connected to the device 100. In this example a light sensor has been detected.

Post Recording.

This parameter sets how the device 100 will behave once the specified preset recording has been completed. Some of the possible options are; the device 100 returns back to it start position, the device 100 powers down, the device 100 remains on and waits for user interaction.

Preset.

Here the user may set the preset recording they would like to use when the auto start begins. In the example given, the Cloud Time Lapse preset has been selected.

Start.

When the user has set all of the parameters they navigate to and select the Start item. This takes the user to a new menu which is the same as the recording menu used elsewhere in the program.

The defining difference between this recording menu and the others used is that the "Recording Starts In" item shows either the time that the unit will be waiting until the recording starts as the difference between the current time and the time set in the Auto Start parameters, or it will display Sensor Input.

When displaying sensor input the device 100 will wait till the sensor input is received before beginning the recording. If both the timer is set to On, and the Sensor is set to On, the recording will only begin once both have been have been executed i.e the time reaches its starting point and then the sensor is activated.

For user reference only the menu also displays the following information.

Rec Time.

This shows the recording time that has been set in the preset the user has chosen Play Time.

This shows the play time that has been set in the preset the user has chosen.

Movement.

This shows the movement setting that is defined by the preset that the user has chosen.

Ramp in/Out.

This shows the ramp in/out setting that has been saved in the preset that the user has chosen.

Frame Rate.

This shows the frame rate that has been saved into the preset that the user has chosen.

Auto Focus.

Displays the auto focus setting that was selected in the preset that the user has chosen for the auto start.

Move Shoot Delay.

Displays the delay between movement that has been set in the preset to be used.

An example of a complete menu layout displayed in a tree format is given as a reference of one of the possible ways that the graphic user interface firmware may be programmed.

---
SYSTEM SETTINGS
About
Backlight Timer 5s
Backlight Brightness (1 - 10)
Sound On
Date Format DD/MM/YYYY
Date 12/10/2011
Time 22:15Units (Metric, imperial)

-continued

Reset All Settings
RESET ALL SETTINGS
OK?
Save
Exit
SYRP
welcome screen
Begin
System Settings
CHOOSE Recording
New Recording
RECORDING MODE
Timelapse
TIMELAPSE SETTINGS
Rec Time xxh:xxm:xxs
Play Time xxh:xxm:xxs
Movement xxx deg
MOVEMENT
Clockwise (Counter clockwise)
Angle xx deg
Set using Keypad
SET START POINT
{Keypad Graphic}
SET END POINT
{Keypad Graphic}
Ramp in / out xs
Advanced Setup
ADVANCED SETUP
Frame rate xxfps (16fps, 24fps, 25fps, 30fps, 50fps,60fps)
Auto Focus x.xs
Move Shoot Delay x.xs
Interval 15s
Playback Speed X10
Min Shutter Speed 10s
Save as new preset
SAVE AS
Timelapse 1_____10h00m/01m15s/170cm
Preview
PREVIEW
Pause Preview
PREVIEW PAUSED
Continue Preview
Return device to start point
Preview Starts in 03s
Start
RECORDING
Pause Recording
RECORDING PAUSED
Continue Recording
Stop Recording
Time Elapsed 1h:30m:00s
Shots Taken 2800
Distance Travelled 120 cm
Time Remaining 4h:00m:00s
Shots Remaining 1200
Distance Remaining 50cm
records starts in 03s
Time Elapsed 00h:00m:00s
Shots Taken 0
Distance Travelled 0 cm
Time Remaining 5h:30m:00s
Shots Remaining 4000
Distance Remaining 170cm
Continious Shots
CAPTURE SETTINGS
Capture Time xxm:xxs
Movement xxx deg
MOVEMENT
Clockwise (Counter clockwise)
Angle xx deg
Set using Keypad
SET START POINT
{Keypad Graphic}
SET END POINT
{Keypad Graphic}
Ramp in / out xs
Advanced Setup
ADVANCED SETTINGS
Auto Focus x.xs -continued Preview
PREVIEW . . .
Pause Preview
PREVIEW PAUSED
Continue Preview
Return device to start point
Preview Starts in 03s
Save as new preset
SAVE AS
Continuous 1_____45s/75deg
Start
RECORDING
Pause Recording
RECORDING PAUSED
Continue Recording
Stop Recording
Time Elapsed 00m:42s
Shots Taken 500
Distance Travelled 70 deg
Time Remaining 00m:3s
Shots Remaining 20
Distance Remaining 5 deg
records starts in 03s
Time Elapsed 00m:42s
Shots Taken 500
Distance Travelled 70 deg
Time Remaining 00m:3s
Shots Remaining 20
Distance Remaining 5 deg
Clouds Time Lapse
CLOUD TIME LAPSE
Start
RECORDING
Pause Recording
RECORDING PAUSED
Continue Recording
Stop Recording
Time Elapsed 1h:27m:42s
Shots Taken 2865
Distance Travelled 120 cm
Time Remaining 4h:32m:10s
Shots Remaining 1200
Distance Remaining 50cm
records starts in 00d:00h:00m:03s
Time Elapsed 1h:27m:42s
Shots Taken 2865
Distance Travelled 120 cm
Time Remaining 4h:32m:10s
Shots Remaining 1200
Distance Remaining 5
Preview
PREVIEW
Pause Preview
PREVIEW PAUSED
Continue Preview
Return device to start point
Preview Starts in 03s
Rec Time xxh:xxm:xxs
Play Time xxh:xxm:xxs
Movement xxx deg
Ramp in / out xs
Frame rate xx
Auto Focus x.xs
Move Shoot Delay x.xs
Interval 15s
Playback Speed X10
Min Shutter Speed 10s
Edit
EDIT CLOUDS TIMELAPSE
Rec Time 03h:15m:02s
Play Time 00h:00m:10s
Movement 160 deg
MOVEMENT
Clockwise (counterclockwise)
Angle 180 deg
Set using Keypad
SET START POINT
{Keypad Graphic}
SET END POINT -continued {Keypad Graphic}
Ramp in / out 2s
Advanced Setup
ADVANCED SETTINGS
Frame rate xxfps (16fps, 24fps, 25fps, 30fps, 50fps,60fps)
Auto Focus 0.5s
Move Shoot Delay 500ms
Interval 15s
Playback Speed X10
Min Shutter Speed 10s
Save
Save as
SAVE AS Delete
Preset Timelapse 1
Preset Timelapse 2
Preset Timelapse 3
Auto Start
AUTO START
Timer on
Dxx/Mxx/Yxxxx xxh:xxm:xxs
Sensor on
Light Sensor
Post Recording Return home (return home, power off, do nothing)
Preset: Clouds Time Lapse
Start
RECORDING
Pause Recording
RECORDING PAUSED
Continue Recording
Stop Recording
Time Elapsed 1h:27m:42s
Shots Taken 2865
Distance Travelled 120 cm
Time Remaining 4h:32m:10s
Shots Remaining 1200
Distance Remaining 50cm
records starts in 00d:00h:00m:03s
Time Elapsed 1h:27m:42s
Shots Taken 2865
Distance Travelled 120 cm
Time Remaining 4h:32m:10s
Shots Remaining 1200
Distance Remaining 50cm
Rec Time xxh:xxm:xxs
Play Time xxh:xxm:xxs
Movement xxx deg
Ramp in / out xs
Frame rate xx
Auto Focus x.xs
Move Shoot Delay x.xs Aspects of the embodiments described herein have been described by way of example only and it should be appreciated that modifications and additions may be made thereto without departing from the scope of the claims herein.

What is claimed is:

1. A motion control apparatus for a camera wherein the apparatus includes:
   a camera attachment for mounting the camera;
   a drive mechanism linked to the camera attachment;
   a linear movement assembly including a drive pulley wherein the drive pulley is operatively associated with the drive mechanism; and
   a line;
   wherein in use, the line is wound around the full circumference of the drive pulley and the drive pulley is driven by the drive mechanism, such that actuation of the drive pulley by the drive mechanism causes linear movement of the drive mechanism and the camera attachment in a linear direction along the line;
   wherein the linear movement assembly is mounted to a support apparatus which includes a camera slider, camera dolly, camera jib arm or cable cam; and
   wherein the line passes through the linear movement assembly under a lowest positioned rib of a ribbed roller located on a periphery of the linear movement assembly, then winds around the full circumference of the drive pulley before exiting the linear movement assembly over the top of the ribbed roller thereby passing over the drive pulley and flat rollers located on the periphery of the linear movement assembly, wherein the flat rollers are on an opposing side to the ribbed rollers.

2. The motion control apparatus as claimed in claim 1 wherein the drive mechanism includes a drive coupling operatively associated with a motor drive configured to engage with the drive pulley.

3. The motion control apparatus as claimed in claim 2, wherein the drive coupling is a geared wheel and the drive coupling rotates about a central axis of an accessory plate, wherein the accessory plate is located opposing a mounting plate.

4. The motion control apparatus as claimed in claim 3, wherein the accessory plate houses the drive pulley.

5. The motion control apparatus as claimed in claim 3 wherein the linear movement assembly is situated between the accessory plate and the mounting plate, is detachable from the drive mechanism and includes a rubber pad.

6. The motion control apparatus as claimed in claim 1 wherein the linear movement assembly includes attachment points located about the edge of an accessory plate for engagement with a quick release mechanism on the motion control apparatus.

7. The motion control apparatus as claimed in claim 1 wherein guide rollers are located about the outside of the drive pulley.

8. The motion control apparatus as claimed in claim 7 wherein the guide rollers are a combination of ribbed and flat rollers.

9. The motion control apparatus as claimed in claim 7 wherein the guide rollers rotate freely about an axis when mounted between an accessory plate and a mounting plate.

10. The motion control apparatus as claimed in claim 1 wherein the line is rope.

11. The motion control apparatus as claimed in claim 1 wherein the motion control apparatus includes a rope fastening device for clasping a piece of rope.

12. The motion control apparatus as claimed in claim 1 wherein the linear movement assembly is detachable from the drive mechanism.

13. The motion control apparatus as claimed in claim 1 wherein the linear movement assembly is mounted using a mounting plate to a support apparatus, and wherein the linear movement assembly engages with an underside of the motion control apparatus including the drive mechanism.

14. The motion control apparatus as claimed in claim 1 wherein the motion control apparatus includes at least two location posts to prevent the motion control apparatus from rotating about the linear movement assembly or while a motor drives the drive mechanism.

15. The motion control apparatus as claimed in claim 1 wherein the motion control apparatus is an integrated unit where all batteries, controllers or software and the drive mechanism are located within a housing of the motion control apparatus.

* * * * *